United States Patent
Moon

(10) Patent No.: US 11,258,972 B2
(45) Date of Patent: Feb. 22, 2022

(54) IMAGE SENSORS, IMAGE PROCESSING SYSTEMS, AND OPERATING METHODS THEREOF INVOLVING CHANGING IMAGE SENSOR OPERATION MODES

(71) Applicant: Samsung Electronics Co., Ltd., Suwon-si (KR)

(72) Inventor: Kyounghwan Moon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 21 days.

(21) Appl. No.: 16/811,497

(22) Filed: Mar. 6, 2020

(65) Prior Publication Data

US 2021/0037204 A1 Feb. 4, 2021

(30) Foreign Application Priority Data

Jul. 29, 2019 (KR) .................. 10-2019-0092007

(51) Int. Cl.
*H04N 5/3745* (2011.01)
*H04N 5/378* (2011.01)
*H04N 5/347* (2011.01)

(52) U.S. Cl.
CPC ......... *H04N 5/37455* (2013.01); *H04N 5/347* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 6,734,911 B1 | 5/2004 | Lyons | |
| 6,765,617 B1 | 7/2004 | Tangen et al. | |
| 8,077,245 B2 | 12/2011 | Adamo et al. | |
| 8,907,288 B2 | 12/2014 | Streuber et al. | |
| 9,389,409 B2 | 7/2016 | Xia | |
| 2004/0141067 A1* | 7/2004 | Nakayama | H04N 5/343 348/222.1 |
| 2005/0212913 A1 | 9/2005 | Richter | |
| 2006/0119903 A1* | 6/2006 | Chiba | H04N 5/3456 358/474 |
| 2009/0021621 A1* | 1/2009 | Hashimoto | H04N 5/35572 348/300 |
| 2009/0079585 A1 | 3/2009 | Chinomi et al. | |

(Continued)

FOREIGN PATENT DOCUMENTS

JP 2005-303450 A 10/2005

*Primary Examiner* — Quan Pham
(74) *Attorney, Agent, or Firm* — Harness, Dickey & Pierce, P.L.C.

(57) ABSTRACT

An image sensor includes a pixel array including a plurality of pixels arranged in a matrix, the plurality of pixels configured to generate separate, respective pixel signals, a row driver configured to selectively read pixel signals generated by pixels of a plurality of rows of the pixel array, a binning circuitry configured to selectively sum or pass through the read pixel signals to generate binned pixel signals, a column array including a plurality of analog-to-digital converters (ADCs) configured to perform an analog-to-digital conversion on the binned pixel signals, and a mode selecting circuitry configured to control the row driver and the binning circuitry to change an operation mode of the image sensor based on a mode signal received at the image sensor to change an operation mode of the image sensor.

13 Claims, 23 Drawing Sheets

| MODE | STATES | | |
|---|---|---|---|
| | FRAME | READOUT | BINNING |
| 1 | i | RS | ENABLE |
| | i+1 | CR | DISABLE |
| 2 | i | RS | ENABLE |
| | | CRS | DISABLE |
| 3 | i | CR | DISABLE |
| | i+1 | CRS | DISABLE | i=POSITIVE INTEGER

(56) References Cited

U.S. PATENT DOCUMENTS

| | | |
|---|---|---|
| 2012/0300021 A1 | 11/2012 | Otuka |
| 2013/0050490 A1 | 2/2013 | Kato |
| 2014/0263964 A1* | 9/2014 | Yang ...................... H04N 5/347 |
| | | 250/208.1 |
| 2015/0291096 A1 | 10/2015 | Chien et al. |
| 2017/0039437 A1 | 2/2017 | Park |
| 2017/0318246 A1* | 11/2017 | Shim .................... H04N 5/3575 |
| 2018/0183998 A1* | 6/2018 | Menachem ............... G06T 3/40 |
| 2018/0241953 A1* | 8/2018 | Johnson ............. G06K 9/00248 |

* cited by examiner

OUTPUT IMAGE 3

OUTPUT IMAGE 4

OUTPUT IMAGE 8

OUTPUT IMAGE 9 i=POSITIVE INTEGER

IMAGE SENSORS, IMAGE PROCESSING SYSTEMS, AND OPERATING METHODS THEREOF INVOLVING CHANGING IMAGE SENSOR OPERATION MODES

CROSS-REFERENCE TO RELATED APPLICATION

This application claims the benefit, under 35 U.S.C. § 119, of Korean Patent Application No. 10-2019-0092007, filed on Jul. 29, 2019, in the Korean Intellectual Property Office, the disclosure of which is incorporated herein in its entirety by reference.

BACKGROUND

The inventive concepts relate to image sensors. More particularly, the inventive concepts relate to readout methods of image sensors and configurations for implementing the methods.

An image capturing device that includes an image sensor may be included in various types of electronic devices such as a smart phone, a personal computer (PC), a surveillance camera, and a vehicle, or may be used as one independent electronic device.

An image capturing device may include, as an image sensor, a charge-coupled device (CCD) image sensor or a complementary metal oxide semiconductor (CMOS) image sensor. The CMOS image sensor is simpler to drive than the CCD image sensor, and may include a signal processing circuit integrated in a single chip. Thus, the CMOS image sensor is miniaturized, and due to small power consumption, the CMOS image sensor is widely used in portable electronic devices such as smart phones.

An image sensor is a sensor in which a plurality of pixels configured to convert an optical signal into an electrical signal are integrated. The image sensor may include a plurality of transistors for each pixel and the image sensor may control turning the transistors on/off. The electrical signals converted by the pixels may be read out, and as a readout method, a global shutter method or the like may be used. The global shutter method may read out the electric signals converted by the pixels in a certain row unit order or may read out the electric signals in an order of a column unit that is arbitrarily changed according to a control signal.

For example, after pixels from an uppermost end to a lowermost end of the CMOS image sensor are read out in an order of a certain column unit, or according to a control signal, pixels from the middle to the lowermost end of the CMOS image sensor are read out in units of columns, pixels from the uppermost end to the middle of the CMOS image sensor may be read out in units of columns.

SUMMARY

The inventive concepts provide image sensors that generates images having two or more image angles based on using one camera module.

According to an aspect of the inventive concepts, an image sensor may include a pixel array including a plurality of pixels arranged in a matrix, the plurality of pixels configured to generate separate, respective pixel signals, a row driver configured to selectively read pixel signals generated by pixels of a plurality of rows of the pixel array, a binning circuitry configured to selectively sum or pass through the read pixel signals to generate binned pixel signals, a column array including a plurality of analog-to-digital converters (ADCs) configured to perform an analog-to-digital conversion on the binned pixel signals, and a mode selecting circuitry configured to control the row driver and the binning circuitry to change an operation mode of the image sensor based on a mode signal received at the image sensor to change the operation mode of the image sensor.

According to another aspect of the inventive concepts, an image processing system may include an image sensor configured to change readout of a row of pixels of a pixel array according to an operation mode of the image sensor, and processing circuitry configured to process frames output from the image sensor. The image sensor may include the pixel array, wherein the pixel array includes a plurality of pixels arranged in a matrix, the plurality of pixels configured to generate separate, respective pixel signals in units of rows of a plurality of rows of pixels of the pixel array. The image sensor may include a row driver configured to selectively read pixel signals generated by pixels of a selected row of the plurality of rows, a binning circuitry configured to selectively sum or pass through the read pixel signals to generate binned pixel signals, a column array configured to perform an analog-to-digital conversion on the binned pixel signals, and a mode selecting circuitry configured to control the row driver and the binning circuitry based on a mode signal received at the image sensor to change the operation mode of the image sensor. The processing circuitry may be configured to output a crop signal setting a region of interest (ROI), output the mode signal to set the operation mode of the image sensor, and process a row image of an image read from the image sensor.

According to another aspect of the inventive concepts, an operation method of an image sensor may include generating a signal to command read at least one row corresponding to a region of interest (ROI) among a plurality of rows of a pixel array, based on a crop signal associated with the ROI, reading an odd-numbered row among the plurality of rows of the pixel array, and reading an even-numbered row among the plurality of rows of the pixel array in response to the even-numbered row corresponding to the ROI.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, example embodiments of the inventive concepts will be described in detail with reference to the accompanying drawings.

Figure 1:
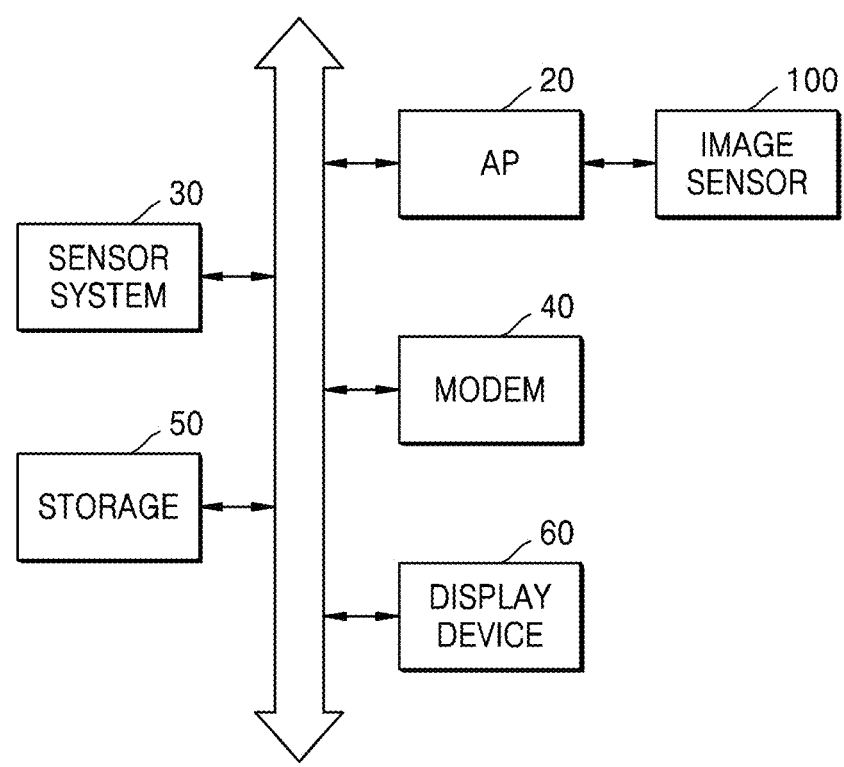
FIG. 1 is a block diagram of an electronic device including an image sensor, according to some example embodiments of the inventive concepts.

FIG. 1 is a block diagram illustrating an electronic device 1 including an image sensor 100, according to some example embodiments of the inventive concepts. The electronic device 1 in FIG. 1 may correspond to various systems including the image sensor 100. For example, various mobile devices such as a digital camera, a portable camcorder, a smartphone, and a vehicle equipped with a camera may correspond to the electronic device 1 of FIG. 1.

As illustrated in FIG. 1, the electronic device 1 may include an application processor (hereinafter, AP) 20, the complementary metal oxide semiconductor (CMOS) image sensor 100, a sensor system 30, a modem 40, a storage device 50, and a display device 60. The AP 20 may be implemented in various forms, for example, as a system on chip (SoC). The AP 20 may include a system having various functions and may control overall operations related to driving of the electronic device 1.

As an example of the image sensor 100, a CMOS image sensor (hereinafter, image sensor) may include a pixel array, and each pixel included in the pixel array may include a photosensitive element. The photosensitive element may generate an electrical signal according to the intensity of absorbed light. An image processing system may be provided in the AP 20 or may be separately provided to receive an electrical signal from the image sensor 100, process the electrical signal, and convert the electrical signal into digital data.

The image sensor 100 may be embedded in the electronic device 1 or implemented as an electronic device. The electronic device 1 may be implemented as, for example, a personal computer (PC), an Internet of Things (IoT) device, or a portable electronic device. The portable electronic device may include a laptop computer, a mobile phone, a smartphone, a tablet PC, a personal digital assistants (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like.

The sensor system 30 may include an accelerometer sensor, a compass sensor, a global positioning system (GPS) sensor, a gyro sensor, an odometer, a geomagnetic sensor, a radio detecting and ranging (RADAR) device, a light detecting and ranging (LIDAR) device, and the like. The sensor system 30 may obtain positioning information indicating a position of a vehicle. In addition, the sensor system 30 may physically measure the surrounding environment of the vehicle.

The modem 40 may support establishment of a wired or wireless communication channel between the electronic device 1 and an external electronic device (not illustrated) and may support communication via the established communication channel. The modem 40 may include one or more communication processors that operate independently of the AP 20 and support wired or wireless communication. According to some example embodiments, the modem 40 may include a wireless communication module (not illustrated) (for example, a cellular communication module, a near field communication module, or a global navigation satellite system (GNSS) communication module), or a wired communication module (not illustrated) (for example, a local area network (LAN) communication module or a power line communication module), and may communicate with an external electronic device through a network by using a corresponding communication module. The various types of modems 40 described above may be implemented in one chip or in separate chips.

The storage device 50 may store various systems or user data necessary for driving the electronic device 1. For example, the storage device 50 may include a non-volatile memory that stores various types of information in a non-volatile manner, a volatile memory in which information such as firmware is loaded in connection with the operation of the electronic device 1, or the like.

The display device 60 may be an example of an output device. Other examples of output devices may include graphics/display devices, computer screens, alarm systems, computer aided design/computer aided machining (CAD/CAM) systems, video game stations, smartphone display screens, or any other type of data output device.

Although the electronic device 1 of FIG. 1 is illustrated to include functional blocks such as the AP 20, the sensor system 30, the modem 40, the storage device 50, and the display device 60, the example embodiments are not limited thereto. For example, the AP 20 may include various types of intellectual properties (IPs), and accordingly, at least some of functions of an image processing system (10 in FIG. 2) and some of functions of the modem 40 may be performed in the AP 20. In some example embodiments, the image processing system 10 and/or the modem 40 may be integrated in the AP 20. It will be understood that any and all functional blocks as described herein may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of one or more of the functional blocks as described herein.

At least some of the AP 20 as described herein may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of at least some of the AP 20. It will be understood that the AP 20 may be implemented by a same instance of processing circuitry or separate instances of processing circuitry.

In some example embodiments, at least some of the image sensor 100 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of at least some of the image sensor 100.

Figure 2:
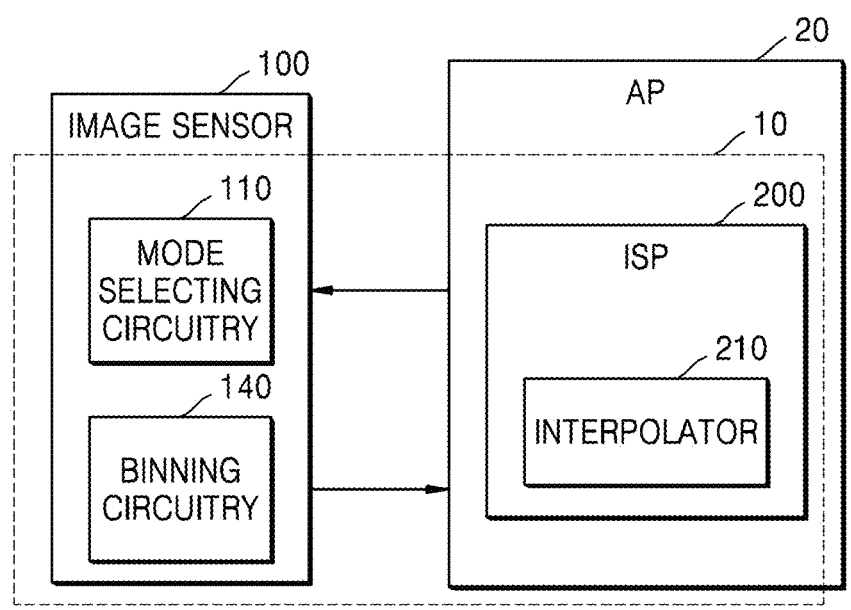
FIG. 2 is a block diagram of an image processing system including an image sensor, according to some example embodiments of the inventive concepts.

FIG. 2 is a block diagram illustrating some example embodiments of the image sensor 100 in FIG. 1. In addition, FIG. 2 further illustrates an image processing system 10 including an image signal processor (hereinafter, ISP) 200 of the AP 20 together with the image processing system 10.

The image sensor 100 may convert an optical signal of an object 80 incident through an optical lens into an electrical signal or an image (that is, image data). The image sensor 100 may include, for example, a pixel array (130 in FIG. 3) including a plurality of pixels arranged in two dimensions and a sensing circuit, and the pixel array may convert received optical signals into electrical signals. For example, the pixel array may be implemented as a photoelectric conversion element such as a charge-coupled device (CCD) or a complementary metal oxide semiconductor (CMOS), and may be implemented as various types of photoelectric conversion elements. The sensing circuit may convert an electrical signal provided from the pixel array 130 into an image and output the image as row data Row_DTA. The image sensor 100 may be implemented as a semiconductor chip including the pixel array 130 and the sensing circuit.

The image sensor 100 may further include a mode selecting circuitry 110 that receives a mode signal for information about an operation mode and changes the operation mode of the image sensor 100 accordingly, and a binning circuitry 140 that selectively sums the electrical signals output from the plurality of pixels or passes through the electrical signals as is, to output binned pixel signals. This issue is described later. As described herein, the image sensor 100 may output particular pixel signals as image data based on the particular operation mode. Accordingly, the image sensor 100 may enable the generation of various images having various angles of view, size, and/or resolution, via various methods, based on being configured to change operation mode.

The ISP 200 may perform an image processing on the row data Row_DTA provided from the image sensor 100 and generate a converted image. Restated, the ISP 200 may process frames output from the image sensor 100. For example, the ISP 200 may perform the image processing on the row data Row_DTA based on set white balance, parameters, color spaces, etc. The converted image may include a color space image such as red-green-blue (RGB) and YUV. A size of the converted image, that is, resolution, may be the same as a size of the raw data Row_DTA. The converted image may be output, for example displayed, in a display device 60 and/or processed by one or more portions of the electronic device 1 (e.g., utilized by a navigation computer of a vehicle electronic device 1 to facilitate navigation and/or driving operations) The converted image may be stored in a memory (not illustrated). The memory (not illustrated) may include a volatile memory such as dynamic random access memory (RAM) (DRAM), static RAM (SRAM), or a non-volatile memory such as phase change RAM (PRAM), resistive RAM (ReRAM), or a flash memory. The converted image stored in the memory (not illustrated) may be used later by the image processing system 10 or stored in a storage device.

In addition, the ISP 200 may generate a scaled image by reducing or increasing the size of the converted image CDT. For example, the ISP 200 may generate the scaled image by scaling the size of the image that has been converted to match a resolution of the display device 60, that is, by scaling the resolution. The ISP 200 may provide the scaled image to the display device 60.

The ISP 200 may operate according to a command of an embedded AP in the AP 20 provided in the electronic device 1. In addition, the ISP 200 may be provided in the electronic device 1 separately from the AP 20. Hereinafter, the ISP 200 is described based on that the ISP 200 is embedded in the AP 20.

The ISP 200 may include an interpolator 210 for restoring the row data Row_DTA that has been lost during the image processing, based on the converted image. This issue is described later. It will be understood that the ISP 200 may be implemented by processing circuitry as described above, where the processing circuitry may be included in and/or may implement the AP 20.

Figure 3:
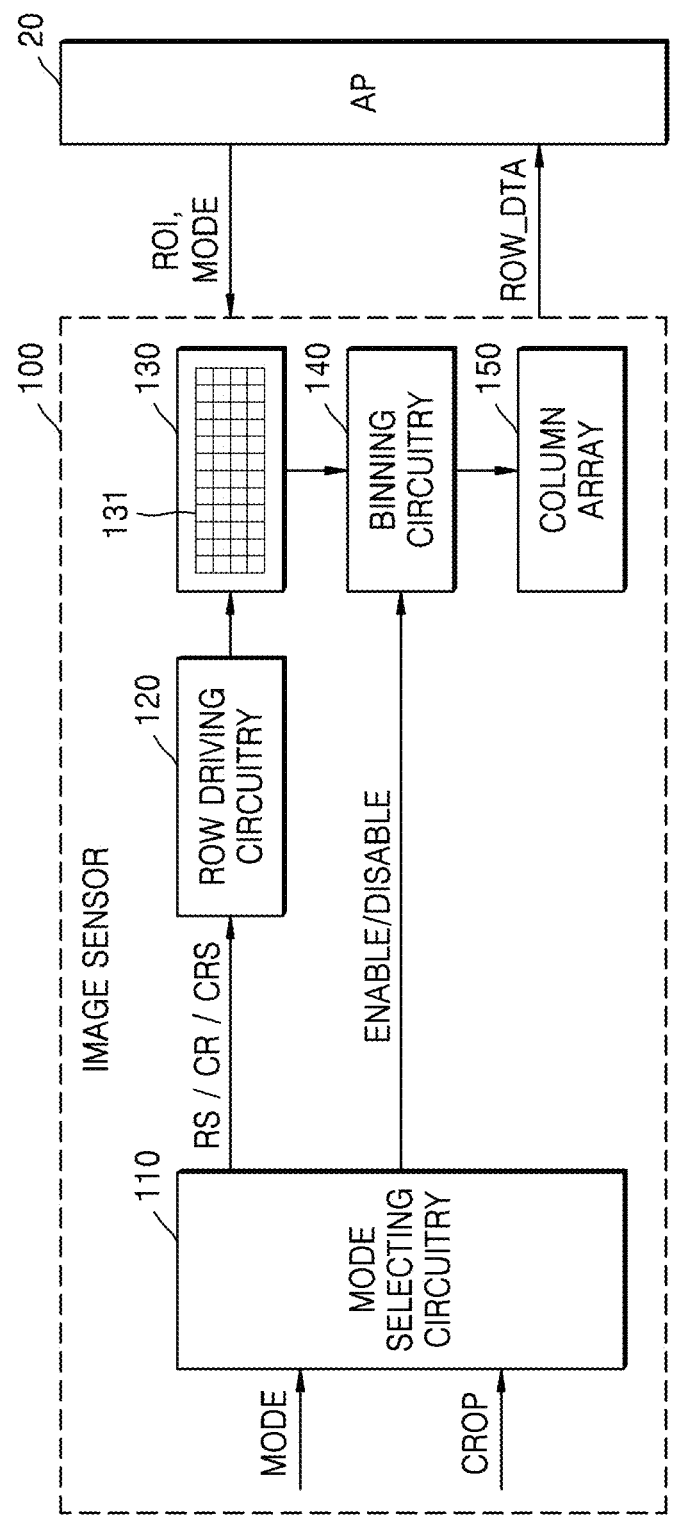
FIG. 3 is a block diagram of an image sensor according to some example embodiments of the inventive concepts.

FIG. 3 is a block diagram of the image sensor 100 according to some example embodiments of the inventive concepts.

Referring to FIG. 3, the image sensor 100 may include a mode selecting circuitry 110, a row driver 120, the pixel array 130, the binning circuitry 140, and a column array 150. In addition to these components, the image sensor 100 may further include additional components for improving a processing speed and generating images having various angles of view. The image sensor 100 may include a CMOS image sensor.

The mode selecting circuitry 110 may generate signals for changing an operation mode of the image sensor 100 (e.g., may cause an operation mode of the image sensor 100 to be changed based on generating one or more signals that control operation of the binning circuitry 140 and generating signals one or more that control operation of the row driver 120) based on an external signal received at the mode selecting circuitry 110 from a signal source that is external to the image sensor 100. For example, the mode selecting circuitry 110 may change the operation mode of the image sensor 100 by receiving, from the AP 20 as one or more external signals, a mode signal MODE associated with changing the mode of the image sensor 100 and a crop signal CROP including information about ("corresponding to") a region of interest (ROI). The mode signal MODE may set the operation mode of the image sensor 100. The crop signal CROP may set the region of interest ROI. For example, the mode selecting circuitry 110 of the image sensor 100 may change the operation mode of the image sensor 100 by generating a readout signal that controls the row driver 120 to change the readout method of the pixel array 130 and by generating a binning signal that controls the binning circuitry 140 to sum or pass through the electrical signals output from the plurality of pixels. It will thus be understood that the image sensor 100 may be configured to change readout of a row of pixels of the pixel array 130 according to a particular operation mode, and thus may provide improved performance, versatility, and/or efficiency of utilization of computing resource and/or power with regard to providing various images having various angles of view, resolution, and/or size.

The pixel array 130 may include a plurality of row lines, a plurality of column lines, and a plurality of pixels 131 each connected to the row line and the column line and arranged in matrix. Each pixel 131 may perform a function of a photoelectric conversion element that converts light into an electrical signal, and each pixel 131 may include a photosensitive element (not illustrated) capable of accumulating photo charges, such as a photodiode, a photo gate, and a photo transistor. Each pixel 131 may sense light by using a light sensing element, and convert the sensed light into a pixel signal that is an electrical signal. Accordingly, it will be understood that the plurality of pixels 131 of the pixel array 130 are configured to generate separate, respective pixel signals. Hereinafter, it is assumed that each pixel 131 of the pixel array 130 includes a photodiode as the light sensing element. In some example embodiments, the pixels 131 of the pixel array 130 are configured to generate separate, respective pixel signals in units of rows of the plurality of rows of pixels 131 of the pixel array 130.

The row driver 120 may drive the pixel array 130 in units of rows based on the readout signal and selectively read a plurality of rows. Restated, the row driver 120 may selectively read pixel signals generated by pixels of a plurality of rows of the pixel array. The row driver 120 may selectively read pixel signals generated by pixels of a selected row of the plurality of rows of the pixel array 130. The row driver 120 may decode an applied signal (e.g., a readout signal generated by the mode selecting circuitry 110) and, in response, select and read at least one row (e.g., a set of rows, where the set may include a single row) among the rows at least partially comprising the pixel array 130. The set of rows may correspond to the ROI. It will be understood herein that a "set" of rows may include only one row. It will be understood herein that a "set" of rows may include multiple rows. The mode selecting circuitry 110 may generate the readout signal that causes the row driver 120 to selectively read the set of rows corresponding to the ROI based on a crop signal CROP received at the image sensor 100, where the crop signal CROP includes row information corresponding to the ROI. For example, the row driver 120 may read the pixel signal by sequentially driving the pixel array 130 from a first row in response to the readout signal, or read only the odd-numbered rows, or read the pixel signal by sequentially driving the set of rows corresponding to the ROI, or read only the odd-numbered rows among the set of rows corresponding to the ROI. In the present description, the image sensor 100 is described as reading the odd-numbered rows, and skipping the even-numbered rows, among the plurality of rows, but the example embodiments are not limited thereto. Instead, it may be understood that only the even-numbered rows are read while the odd-numbered rows are skipped.

The binning circuitry 140 may selectively sum or pass through the pixel signals received via the column line of a column in which the pixel read from the pixel array 130 is located, based on the binning signal. A pixel signal that is summed or passed through by the binning circuitry 140 may be referred to as a binned pixel signal that is generated by the binning circuitry 140 based on summing or passing through the pixel signal received at the binning circuitry 140. An operation of the binning circuitry 140 is described in detail later with reference to FIG. 9.

The column array 150 may convert the pixel signal that has been received via the column line and summed or passed through by the binning circuitry 140 (e.g., the binned pixel signal) based on an address signal provided by a timing generating circuitry that generates signals (for example, a row control signal, an address signal, a clock signal, and a ramp control signal) for driving each component of the image sensor 100 into a digital value, store the converted digital value, and then output the stored digital value. In addition, the converted digital value may be post-processed in units of rows by the AP 20. The image sensor 100 may output the digital value in units of rows to the AP 20 as the row data Row_DTA. Accordingly, the AP 20 may process the row data Row_DTA as a row image of an image read from the image sensor 100.

Figure 11:
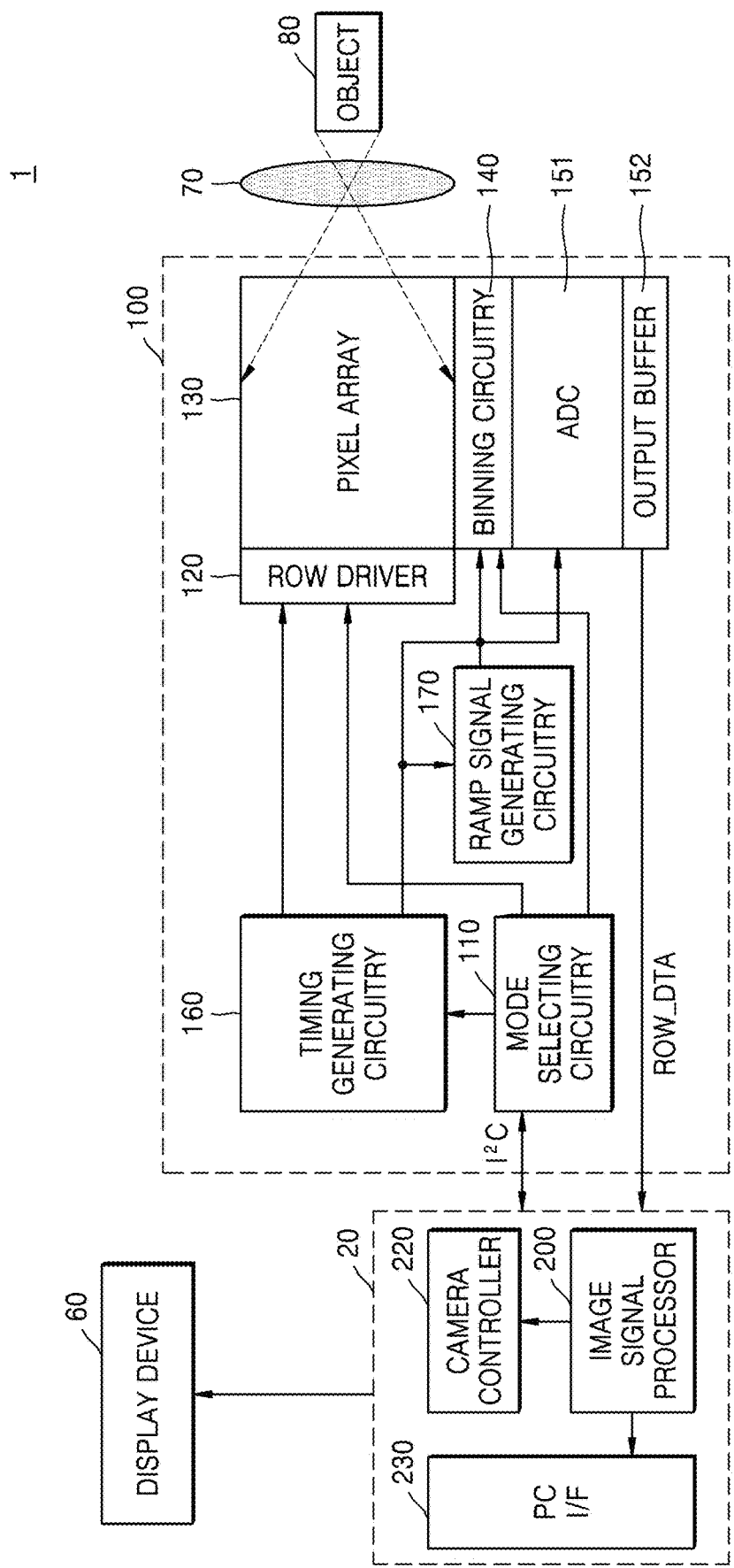
FIG. 11 is a block diagram of an image processing system according to some example embodiments of the inventive concepts.

The column array 150 may include a plurality of analog-to-digital converters (ADCs) (151 in FIG. 11). Each of the plurality of ADCs 151 may receive the pixel signal from a corresponding column line among the plurality of column lines COL and convert the pixel signal into a digital value.

Restated, the ADCs 151 may perform an analog-to-digital conversion on binned pixel signals received from the binning circuitry 140. Thus, the column array 150 may be configured to perform an analog-to-digital conversion on the binned pixel signals received at the column array 150 from the binning circuitry 140.

The plurality of pixel signals output from the plurality of pixels may have a deviation due to inherent characteristics (for example, fixed pattern noise (FPN), etc.) of each pixel 131, and/or a deviation due to characteristic differences between logics for outputting the pixel signal from the pixel 131 (for example, transistors for outputting photo charges stored in the photoelectric conversion element in the pixel 131). To compensate for the deviation between the plurality of pixel signals output via the plurality of column lines COL, a reset signal (or reset component) and a cell signal (or unit component) of the pixel signal may be extracted and then a difference therebetween (for example, voltage difference) may be extracted as a valid signal component. A process performed in this manner is called correlated double sampling (hereinafter, referred to as CDS). The ADC 151 may output a comparison signal that is a signal for a comparison result to which the CDS has been applied, and the column array 150 may output the digital value by counting the output comparison signal.

Methods of reading out the pixel array 130 may be divided into a method of reading in units of rows and a method of reading in units of columns.

The read-by-row method may include a row-full-read (R_Full_Read) method in which all the plurality of rows of the pixel array 130 are read; a row-crop-read (R_Crop_Read) method in which a selected region among the rows of the pixel array 130 is read; an alternating row-1read-1skip (R_1Read_1Skip) method in which the row driver 120 alternately repeats reading any one row among the plurality of rows of the pixel array 130 and skipping another row; a row-1read-2skip (R_1Read_2Skip) method in which the row driver 120 alternately repeats reading any one row among the plurality of rows of the pixel array 130 and successively skipping two rows immediately below the any one row; and a row-1read-3skip (R_1Read_3Skip) method in which the row driver 120 alternately repeats reading any one row among the plurality of rows of the pixel array 130 and successively skipping three rows immediately below the any one row. However, there may be additional various read-by-row methods.

The read-by-column method may include a column-full-read method in which the pixel signals of all the pixels 131 on the read rows among the plurality of rows of the pixel array 130 are received and all the pixel signals are digitally converted as is; a column-1read-1skip (C_1Read_1skip) method in which the column array 150 receives only pixel signals of every odd-numbered column; a 2-binning (2_Binning) method in which the binning circuitry 140 receives and sums the pixel signals of two adjacent pixels 131 among the read rows among the rows of the pixel array 130, outputs the summed pixel signals to the column array 150, and the column array 150 digitally converts the summed pixel signals; and a 3-binning (3-binning) method in which the binning circuitry 140 receives and sums the pixel signals of three adjacent pixels 131 among the read rows among the rows of the pixel array 130, outputs the summed pixel signals to the column array 150, and the column array 150 digitally converts the summed pixel signals. However, there may be additional various read-by-column methods.

The readout signal generated by the mode selecting circuitry 110 and controlling the pixel array 130 in units of rows may include at least one of RS signal, a CR signal, or a CRS signal. The RS signal may correspond to a signal instructing to alternately perform skipping and reading along the row for the plurality of rows of the pixel array 130. For example, the RS signal may include a first signal that commands an alternate sequential repetition of reading a first row of the plurality of rows and skipping a second row of the plurality of rows that is immediately below the first row. The CR signal may correspond to a signal instructing to sequentially perform reading the set of rows corresponding to at least some region of the plurality of rows of the pixel array 130, including, for example a one or more rows corresponding to the ROI. For example, the CR signal may include a second signal that commands sequential reading of one or more rows corresponding to the ROI. The CRS signal may correspond to a signal indicating to sequentially perform skipping and reading along the row with respect to the set of rows corresponding to at least some region of the plurality of rows of the pixel array 130. For example, the CRS signal may include a third signal that commands alternate repetition of reading and skipping, sequentially, the set of rows corresponding to the ROI. A readout operation of the image sensor 100 based on the RS signal, the CR signal, and the CRS signal is described later with reference to FIGS. 4C, 5B, and 5C.

The binning signal, which is a signal generated by the mode selecting circuitry 110 and instructing to sum or pass through the pixel signals read from the pixel array 130, may include an enable signal ENABLE and a disable signal DISABLE. For example, the enable signal ENABLE may be applied to the binning circuitry 140 to sum the read pixel signals, and the disable signal DISABLE may be applied to the binning circuitry 140 to pass through the read pixel signals. For example, the binning circuitry 140 may, in response to the enable signal ENABLE, receive and sum the pixel signals through the column line of the column in which the read pixel 131 is located, and in response to the disable signal DISABLE, pass through the pixel signals that have been received through the column line of the column in which the read pixel is located. An operation of the binning circuitry 140 is described in detail later with reference to FIG. 9.

The image sensor 100 may have a plurality of operation modes including a first operation mode and a second operation mode. The image sensor 100 may have a plurality of operation modes including the first operation mode, the second operation mode, and a third operation mode. Accordingly, it will be understood that the operation mode of an image sensor 100, which may be changed based on control of the row driver 120 and the binning circuitry 140 by the mode selecting circuitry 110 based on a mode signal MODE may include one of the first operation mode, the second operation mode, or the third operation mode. The first operation mode and the second operation mode are described later in detail with reference to FIGS. 4A through 7B. The third operation mode is described later in detail with reference to FIG. 10.

Figure 4A:
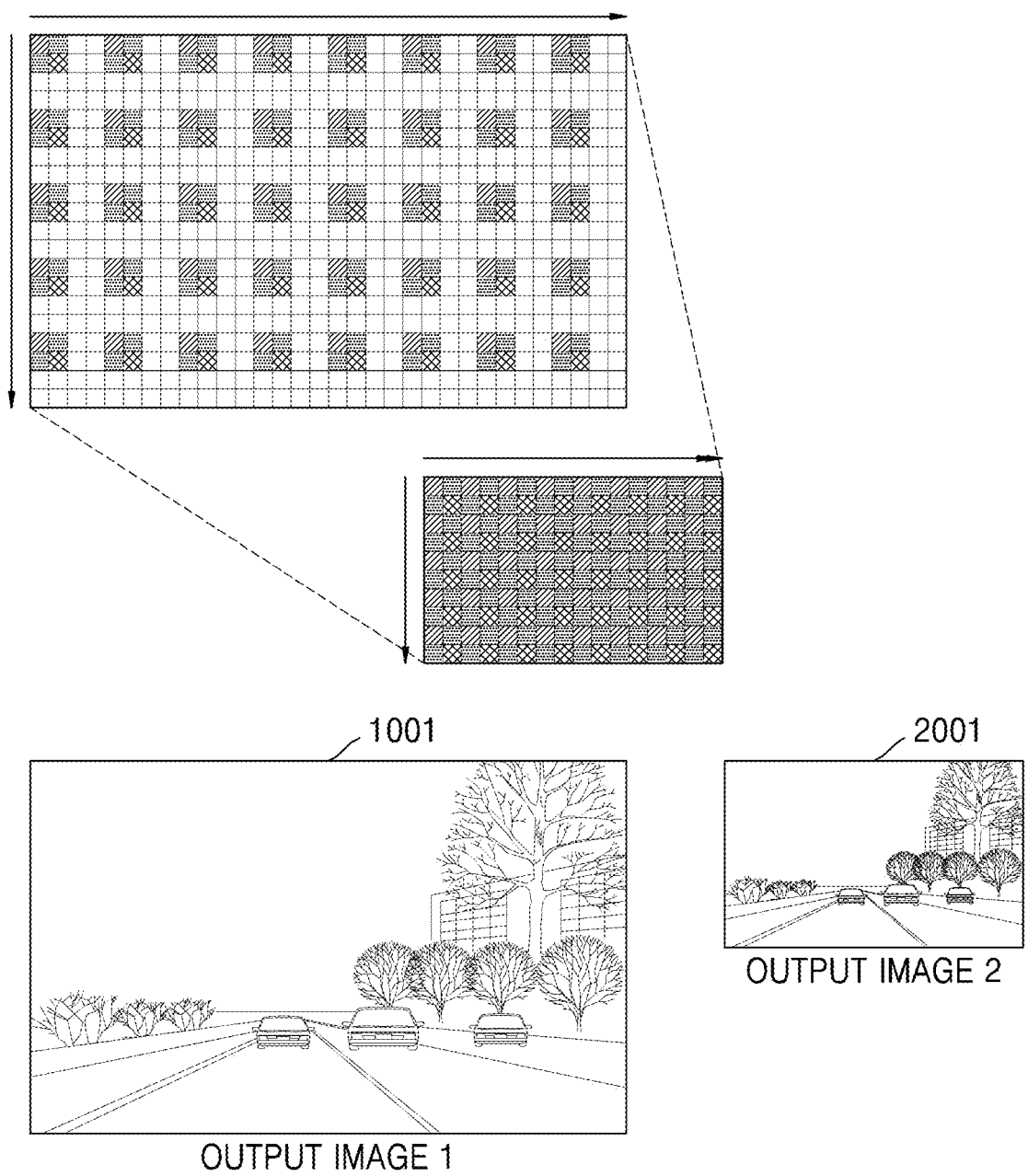
FIG. 4A is a diagram illustrating an example of a readout method of an image sensor and a readout image, according to some example embodiments of the inventive concepts.

FIG. 4A is a diagram illustrating an example of a readout method of the image sensor 100 and a readout image, according to some example embodiments of the inventive concepts. The readout method illustrated in FIG. 4A may be, for convenience of explanation, a readout method to which the row-1read-1skip (R_1Read_1Skip) method in units of rows and the column-1read-1skip (C_1Read_1Skip) method in units of columns are applied. As a result of applying the row-1read-1skip (R_1Read_1Skip) method and the column-1read-1skip (C_1Read_1Skip) method, the output image that has a ¼ resolution, a ½ horizontal length, and a ½ vertical length of an original image of the image sensor 100 may be generated. However, the example embodiments are not limited thereto, and output images of various resolutions may be generated by using various readout methods. For example, as a result of applying the row-1read-2skip (R_1Read_2Skip) method and the column-1read-2skip (C_1Read-2Skip) method, an output image having ⅑ resolution may be generated.

The read pixel may include four sub-pixels arranged in an order of R-G-B-G clockwise from the top left, in which R denotes a red color, G denotes a green color, and B denotes a blue color. In all the drawings below, the four sub-pixels arranged in the order of R-G-B-G clockwise from the top left may indicate that the colors are represented by a combination of R-G-B when being output to the display device 60, but this may not mean that an actual implementation of the pixel array 130 of the image sensor 100 is carried out by using four sub-pixels.

When the uppermost row of the pixel array 130 is read, the column-1read-1skip (C_1Read_1skip) method for reading only the pixel signals of every odd-numbered column sequentially from the leftmost pixel to the right direction may be performed.

When the readout method is based on the row-1read-1skip (R_1Read_1Skip) method and the column-1read-1skip (C_1Read_1skip) method, a second output image 2001 may be generated by reading the pixel signal of the pixel at every odd-numbered column and every odd-numbered row. As a result, the second output image 2001 may be an image having a ¼ resolution, a ½ horizontal length, and a ½ vertical length of the first output image 1001 that has been generated by using the row-full-read (R_Full_Read) method for the rows of the pixel array 130 and the column-full-read (C_Full_Read) method for the columns of the previous pixel array 130.

Figure 4B:
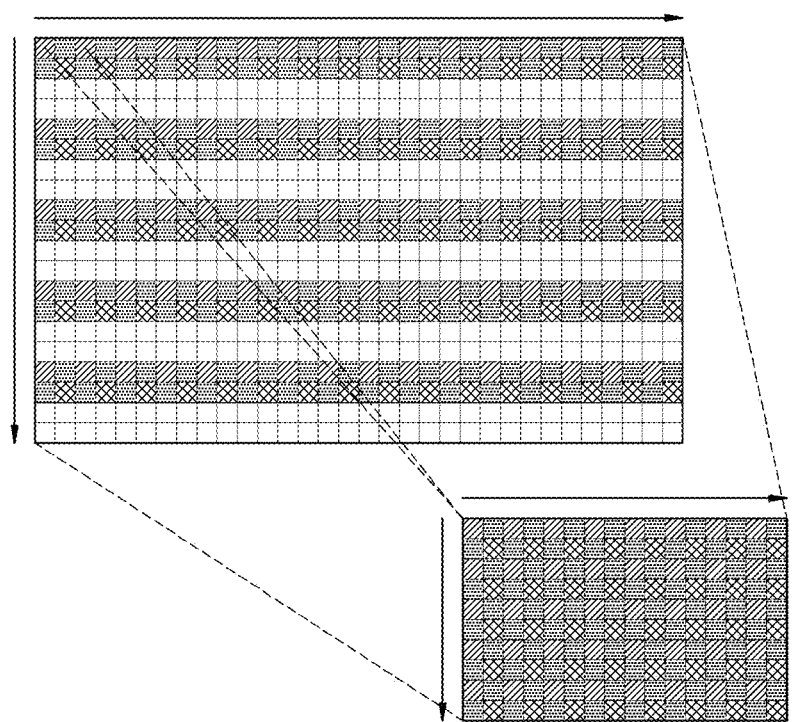
FIG. 4B is a diagram illustrating another example of a readout method of an image sensor and a readout image, according to some example embodiments of the inventive concepts.
Figure 4B:
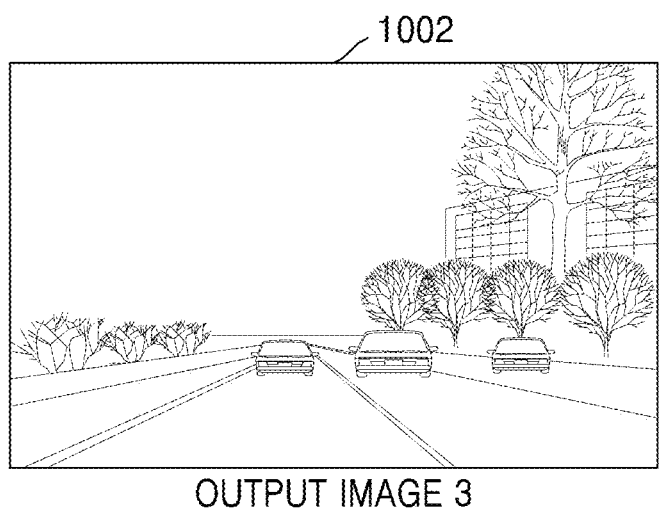
Figure 4B:
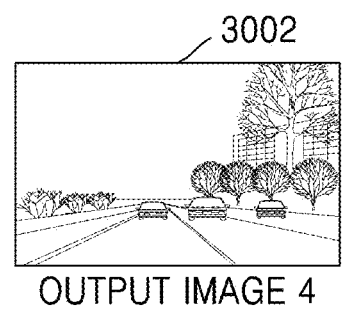

FIG. 4B is a diagram illustrating another example of a readout method of the image sensor 100 and a readout image, according to some example embodiments of the inventive concepts. The readout method illustrated in FIG. 4B may be a readout method to which the row-1read-1skip (R_1Read_1Skip) method in units of rows and the 2-binning (2_Binning) method in units of columns are applied.

When the uppermost row of the pixel array 130 is read, the pixel signals of all the pixels on the row sequentially read from the leftmost pixel to the right direction may be read, and the 2-binning (2_Binning) readout method in which the pixel signals are summed in the binning circuitry 140 may be performed. In other words, based on a readout method to which the row-1read-1skip (R_1Read_1Skip) method and the 2-binning (2_Binning) method are applied, a fourth output image 3002 may be generated by reading and summing the pixel signals of two pixels at every odd-numbered row and every odd-numbered column and at every odd-numbered row and every even-numbered column. As a result of the summing, the fourth output image 3002 may be an image having a ¼ resolution, a ½ horizontal length, and a ½ vertical length of a third output image 1002 that has been generated by using the row-full-read (R_Full_Read) method for the rows of the previous pixel array 130 and the column-full-read (C_Full_Read) method for the columns of the previous pixel array 130.

Figure 4C:
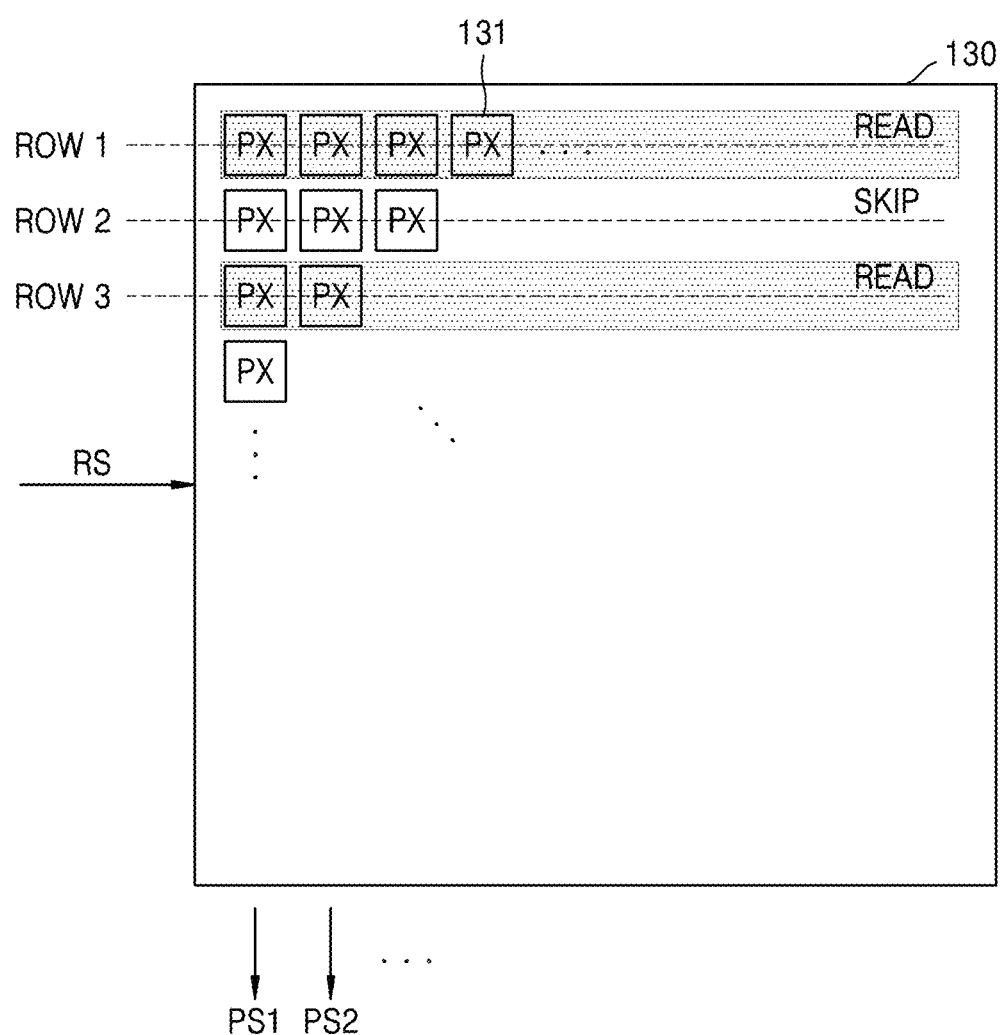
FIG. 4C is a diagram illustrating a readout method according to a readout signal of a pixel array of an image sensor, according to some example embodiments of the inventive concepts.

FIG. 4C is a diagram illustrating the row-1read-1skip (R_1Read_1Skip) method according to the RS signal of the pixel array 130 of the image sensor 100, according to some example embodiments of the inventive concepts. FIG. 4C, unlike FIGS. 4A and 4B illustrating images output on the display device 60, may illustrate a direct reading process from the pixel array 130.

As described above, the RS signal may be a signal (e.g., a first signal) that commands an alternate sequential repetition of reading the first row of the plurality of rows of the pixel array 130, skipping a second row immediately below the first row (where "immediately below" refers to being below the first row without any interposing rows), and reading a third row immediately below the second row, to all rows of the pixel array 130. In other words, the RS signal may be a signal for controlling the pixel array 130 to be read in the row-1read-1skip (R_1Read_1Skip) method. Restated, the RS signal may command an alternate sequential repetition of reading a first row of the plurality of rows and skipping a second row immediately thereunder.

The pixel array 130 may, in response to the RS signal, alternately repeat reading the first row or the uppermost row among the plurality of rows and skipping the second row. The pixel signal read out for each row may be output for each row as a first pixel signal PS1 along the column line of a first column located on the leftmost side of the pixel array 130, and may be output for each row as a second pixel signal PS2 along the column line of a second column that is a first right column of the first column.

Figure 5A:
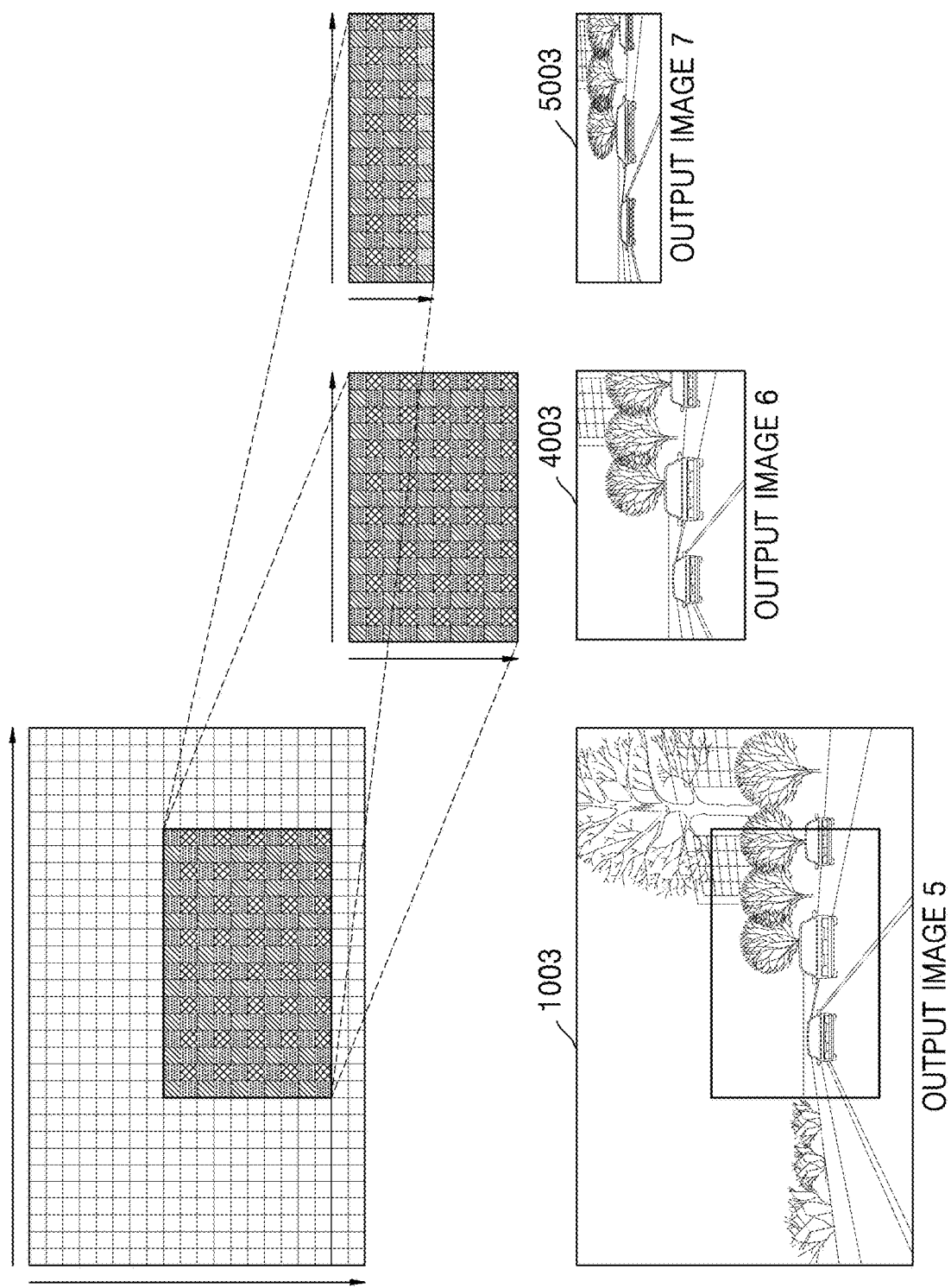
FIG. 5A is a diagram illustrating an example of a readout method of an image sensor and readout images, according to some example embodiments of the inventive concepts.

FIG. 5A is a diagram illustrating an example of a readout method of the image sensor 100 and readout images, according to some example embodiments of the inventive concepts. The readout method illustrated in FIG. 5A may be a readout method to which the row-crop read (R_Crop_Read) method and the column-full-read (C_Full_Read) method are applied.

When the pixel signals are sequentially read from the uppermost row to the undermost row in the selected region (for example, the region of interest ROI) among the plurality of rows of the pixel array 130, the pixel signals PX may be read in a region sequentially selected from the leftmost end pixel to the rightmost end pixel of the selected region of the read row, and the readout in which the pixel signals are not summed but passed through in the binning circuitry 140 may be performed. In other words, based on the readout method to which the low-crop-read (R_Crop_Read) method and the column-full-read (C_Full_Read) method are applied, a sixth output image 4003 may be generated in which the pixel signals of pixels at every column and every row in the selected region (for example, a region of interest ROI) among the plurality of rows of the column array 150 are read.

In addition, in the region selected among the plurality of rows of the pixel array 130, an operation of skipping the odd-numbered rows from the uppermost row and reading the even-numbered rows may be alternately repeated, the pixel signals of all pixels may be sequentially read from the leftmost pixel to the right on the read rows, and the readout in which the pixel signals are not summed but passed through in the binning circuitry 140 may be performed. In other words, based on the readout method to which the low-crop-read (R_Crop_Read) method and the column-full-read (C_Full_Read) method are applied, a seventh output image 5003 may be generated in which the pixel signals of pixels at every column and every row in the selected region (for example, a region of interest ROI) among the plurality of rows of the column array 150 are read.

Referring to FIG. 3, the selected region may be set as the region of interest ROI by the AP 20 and may be related to the crop signal CROP transmitted to the image sensor 100. Restated, the AP 20 may output a crop signal CROP that sets (e.g., defines) a particular region of the pixel array 130 as the region of interest ROI. Referring again to FIG. 5A, a fifth output image 1003 may correspond to an image generated by the row-full-read (R_Full_Read) method of rows and the column-full-read (C_Full_Read) method of columns, and the region of interest ROI may correspond to an area indicated by a bold line on the fifth output image 1003.

The seventh output image 5003 may read only the odd-numbered rows as a result of alternate repetition of reading the odd-numbered rows and skipping the even-numbered rows from the uppermost row in the selected region among the plurality of rows, and thus may have the same horizontal length and ½ times the vertical length of the sixth output image 4003.

Figure 5B:
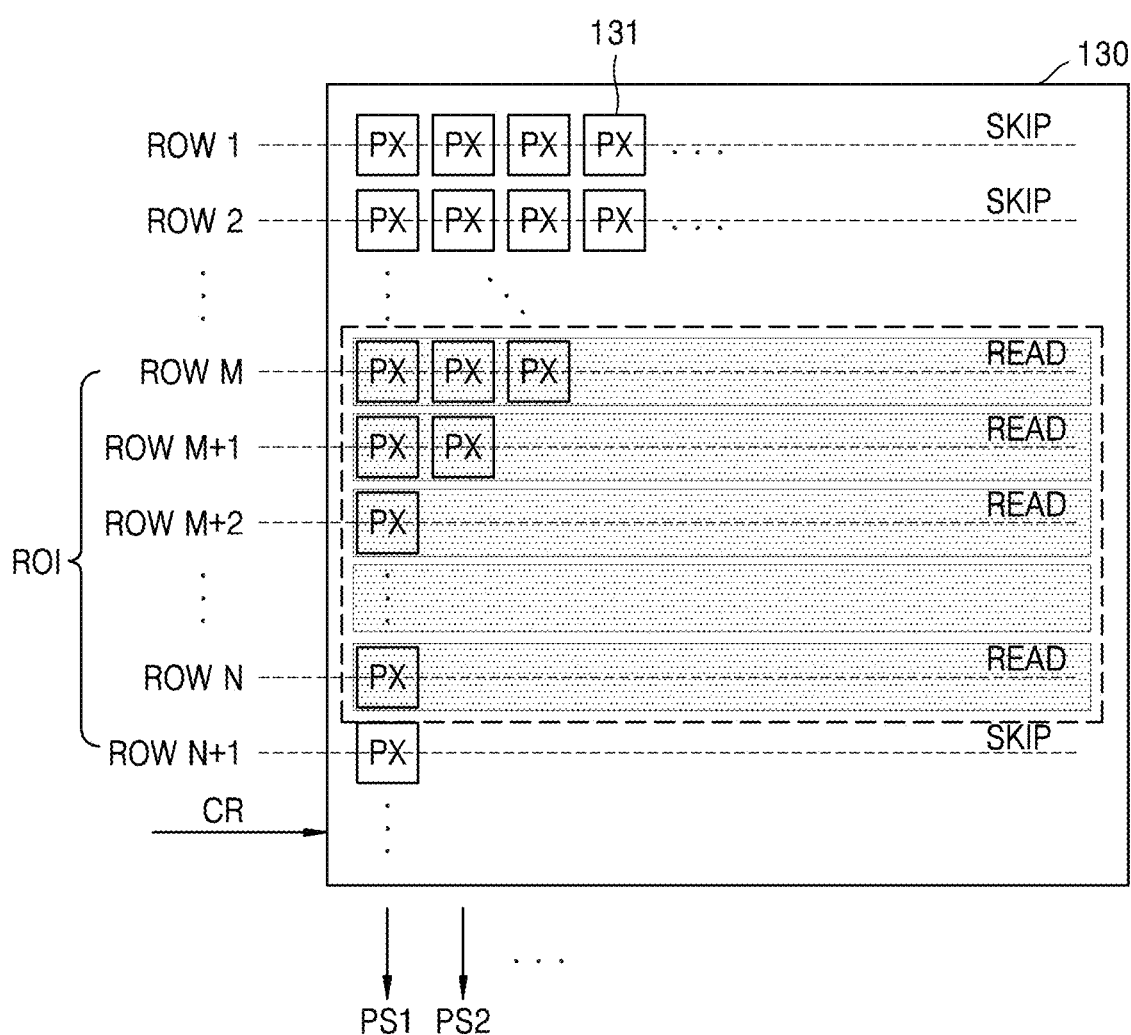
FIGS. 5B and 5C are diagrams illustrating readout methods according to different readout signals of a pixel array of an image sensor, according to example embodiments of the inventive concepts, respectively.
Figure 5C:
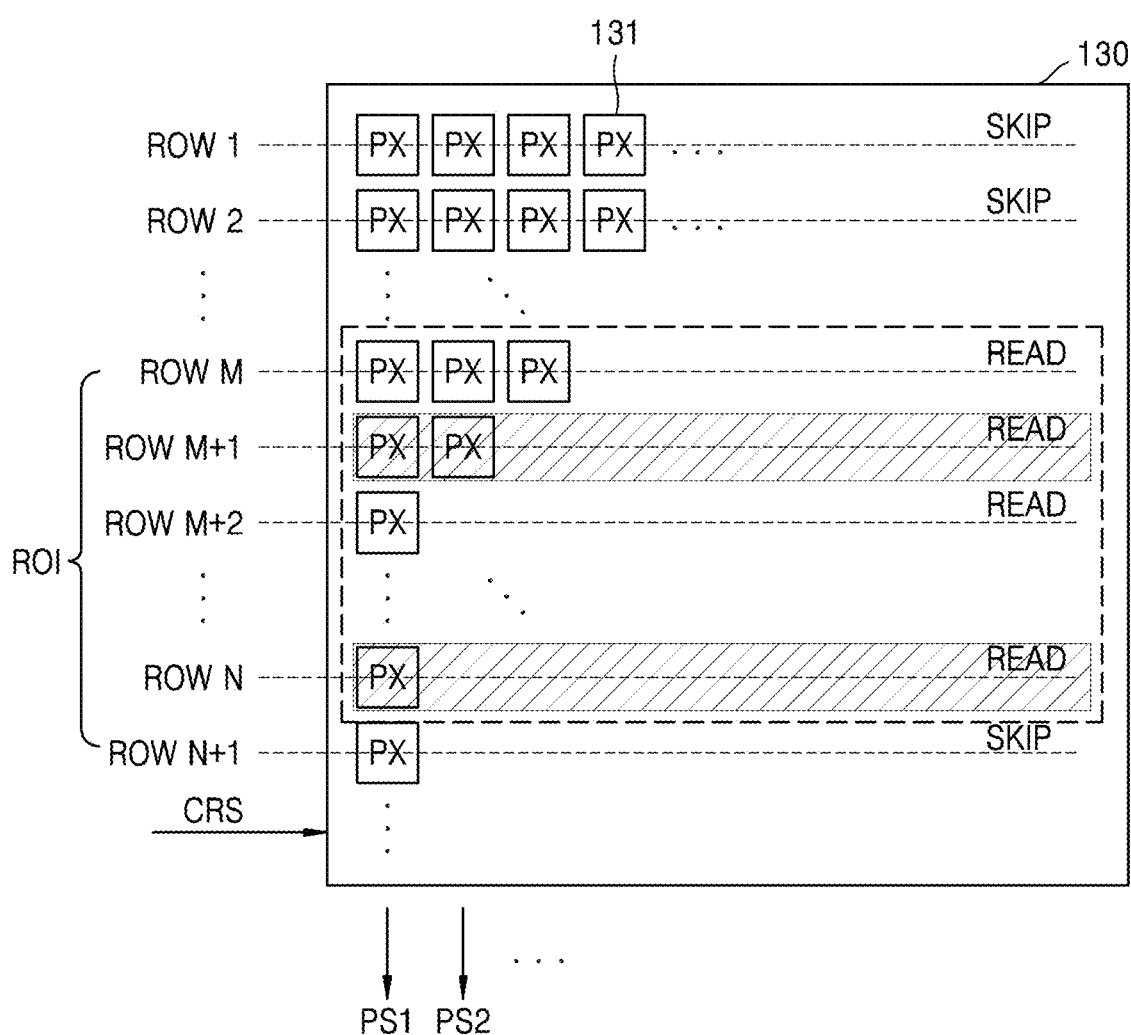

FIGS. 5B and 5C are diagrams illustrating readout methods according to different readout signals of the pixel array 130 of the image sensor 100, according to example embodiments of the inventive concepts, respectively; FIG. 5B is a diagram illustrating the crop-read (Crop_Read) method according to the CR signal in the row driver 120 of the image sensor 100, according to some example embodiments of the inventive concepts, and FIG. 5C is a diagram illustrating the crop-read (Crop_Read) method according to the CRS signal in the pixel array 130 of the image sensor 100, according to some example embodiments of the inventive concepts. FIGS. 5B and 5C, unlike FIG. 5A illustrating images output on the display device 60, may illustrate a direct reading process from the pixel array 130. In addition, as illustrated in FIGS. 4A and 4B, output images having various resolutions may be generated by various readout methods. Hereinafter, for convenience of description, it is assumed that the region of interest ROI has a size corresponding to half of the horizontal and vertical lengths and a ¼ resolution of the pixel array 130.

Referring to FIG. 5B, the pixel array 130 may sequentially read a plurality of rows corresponding to the region of interest ROI (e.g., set of rows corresponding to the region of interest ROI) among the plurality of rows in response to the CR signal. For example, the region of interest ROI may include an $M^{th}$ row through an $N^{th}$ row. In other words, the pixel array 130 may skip the remaining rows except for the region of interest ROI, and sequentially read the $M^{th}$ through $N^{th}$ rows along the row. The pixel signal read out for each row may be output for each row as the first pixel signal PS1 along the column line of a first column located on the leftmost side of the pixel array 130, and may be output for each row as the second pixel signal PS2 along the column line of a second column that is a first right column of the first column.

Referring to FIG. 5C, the pixel array 130 may, in response to the CRS signal, sequentially read the plurality of rows corresponding to the region of interest ROI (e.g., set of rows corresponding to the region of interest ROI) from the $M^{th}$ row, which is the uppermost row of the set of rows corresponding to the region of interest ROI of the plurality of rows. For example, the region of interest ROI may include the $M^{th}$ row through the $N^{th}$ row. In other words, the pixel array 130 may alternately repeat, along a row up to the $N^{th}$ row, skipping the $M^{th}$ row that is an odd-numbered row among the $M^{th}$ through $N^{th}$ rows and reading the $(M+1)^{th}$ row to that is the even-numbered row. The pixel signals read out for each row may be output for each row as the first pixel signal PS1 along the column line of the first column located on the leftmost side of the pixel array 130, and may be output for each row as the second pixel signal PS2 along the column line of the second column that is the first right column of the first column.

Figure 6A:
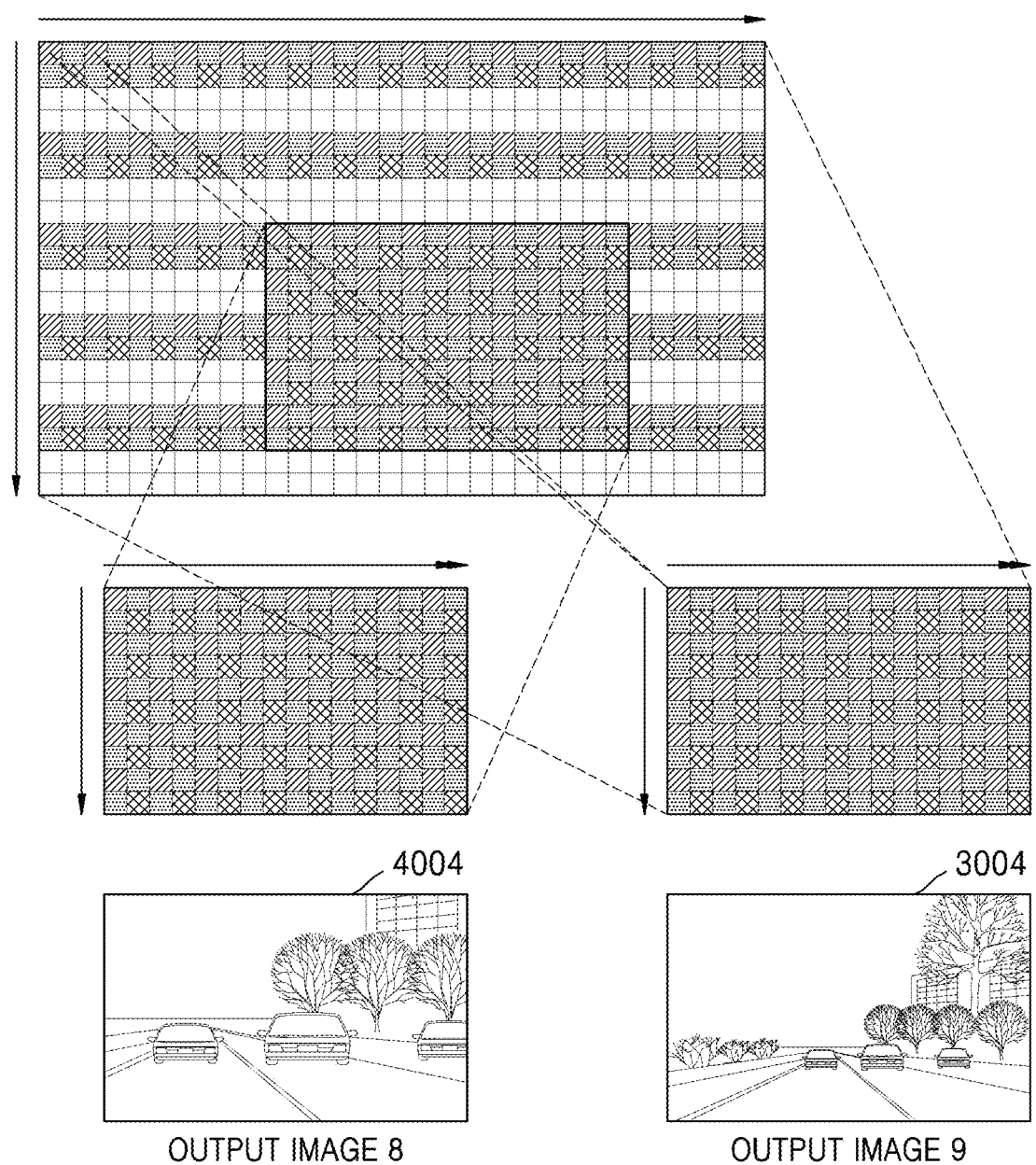
FIG. 6A is a diagram illustrating that images having different angles of view are output according to readout methods, according to some example embodiments of the inventive concepts.

FIG. 6A is a diagram illustrating that images having different angles of view are output according to readout methods, according to some example embodiments of the inventive concepts. An eighth output image 4004 in FIG. 6A may be an image that is a frame image generated by the image sensor 100 by using the readout method to which the crop-read (Crop_Read) method and the column-full-read (C_Full_Read) method are applied and outputting to the display device 60, and a ninth output image 3004 in FIG. 6A may be an image that is a frame image generated by the image sensor 100 by using the readout method to which the row-1read-1skip (R_1Read_1Skip) method and the 2-binning (2_Binning) method are applied and outputting to the display device 60. As a result, the ninth output image 3004 may have the same resolution as the eighth output image 4004 but have a relatively wider angle of view.

Figure 6B:
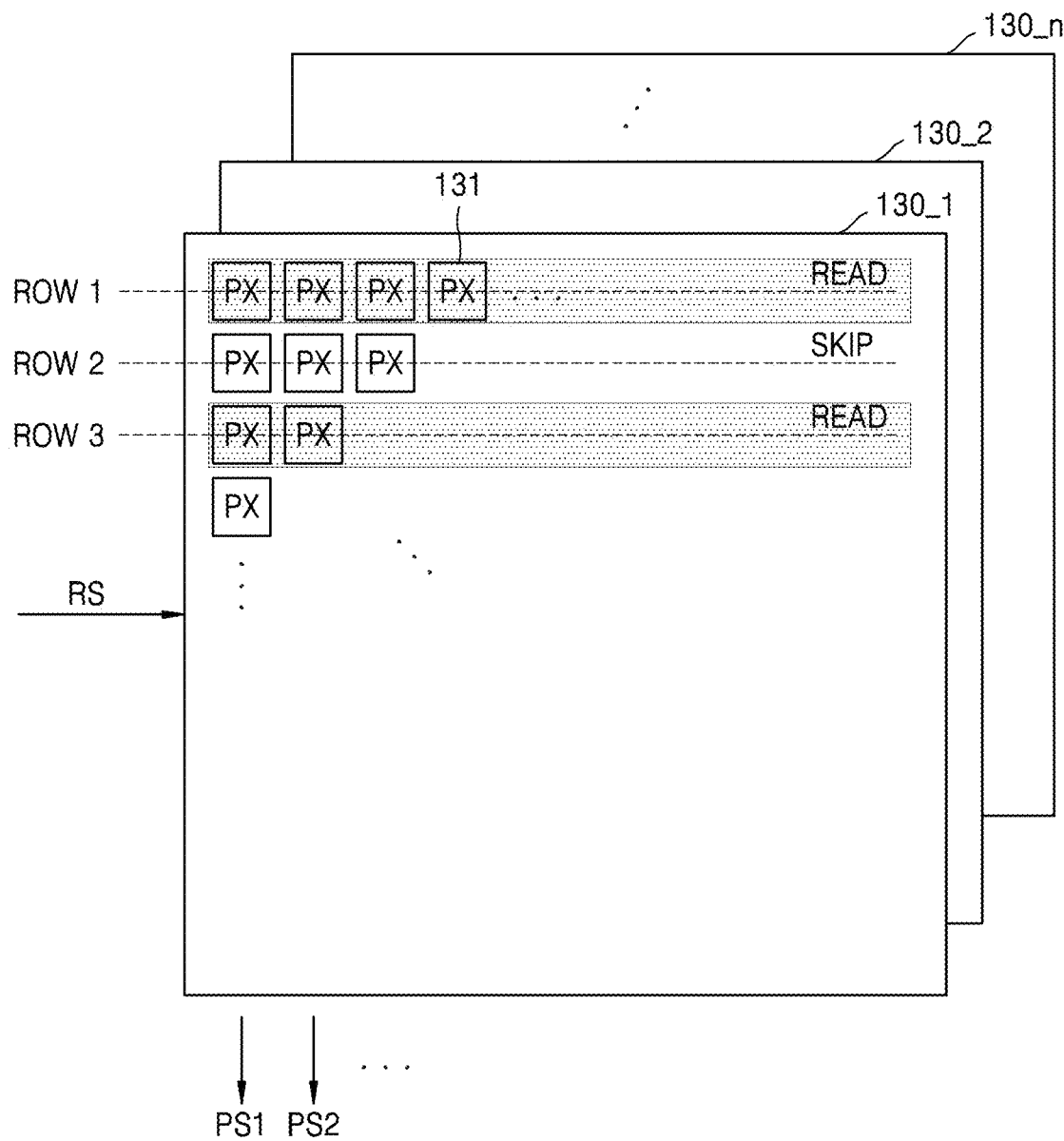
FIGS. 6B and 6C are diagrams illustrating readout methods according to different readout signals of a pixel array of an image sensor, according to example embodiments of the inventive concepts, respectively.
Figure 6C:
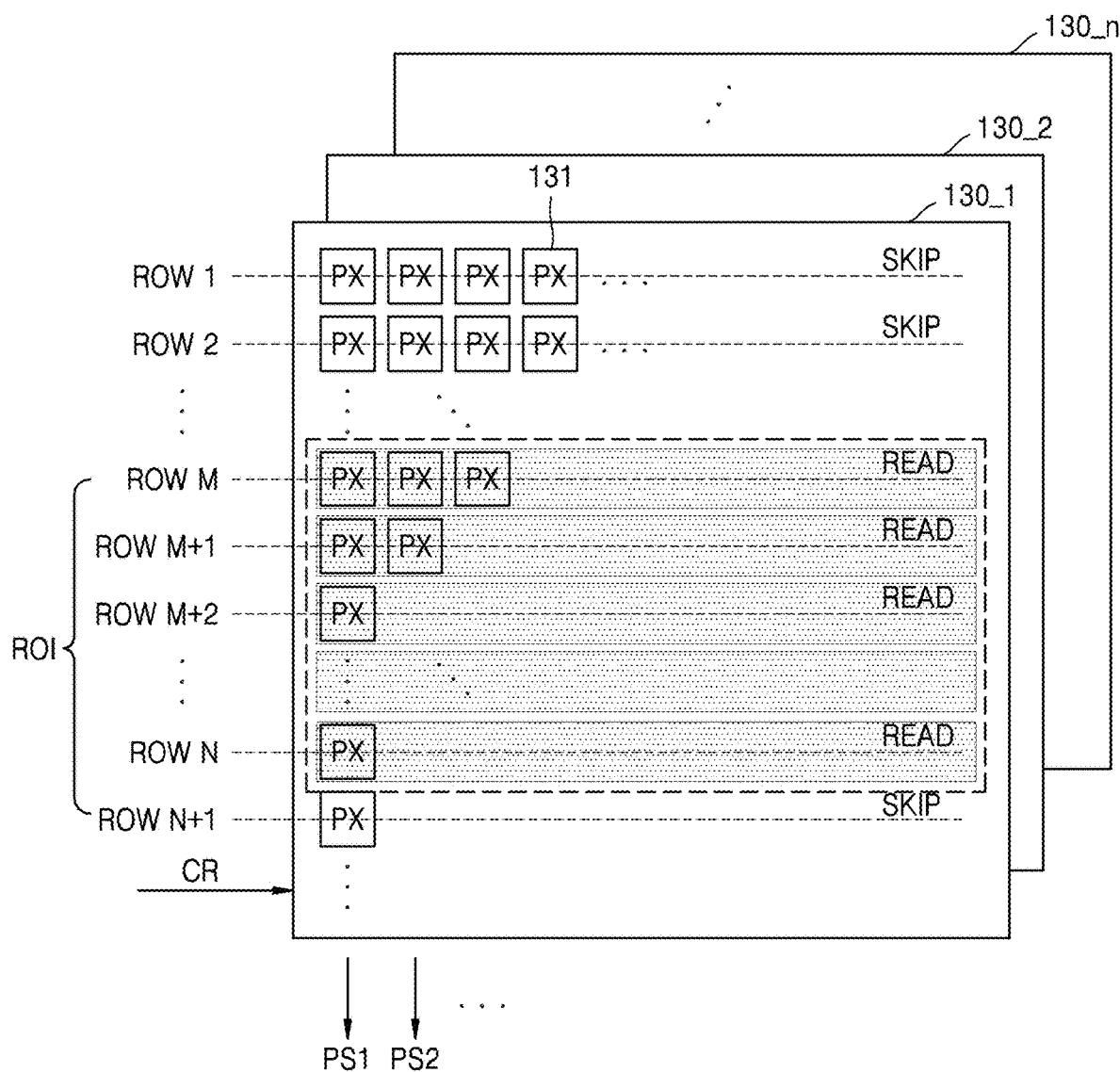

FIGS. 6B and 6C are diagrams illustrating readout methods according to different readout signals of the pixel array 130 of the image sensor 100, according to example embodiments of the inventive concepts, respectively. FIG. 6B illustrates a readout method for outputting the ninth output image 3004 in FIG. 6A from a current frame, and FIG. 6C illustrates a readout outputting the ninth output image 3004 in FIG. 6A from the next frame.

Referring to FIG. 6B, the mode selecting circuitry 110 may receive the mode signal MODE related to an operation mode of the image sensor 100, generate the RS signal, and apply the RS signal to the row driver 120, and the row driver 120 may alternately repeat reading the plurality of rows of the pixel array 130 by using the row-1read-1skip (R_1Read_1Skip) method.

Referring to FIG. 6B, on the current frame, a first pixel array 130_1 may, in response to the RS signal, alternately repeat reading the first row, which is the uppermost row among the plurality of rows, and skipping the second row, in the same manner as described with respect to FIG. 4C.

Referring to FIG. 6C, on the next frame, a second pixel array 130_2 may, in response to the CR signal, sequentially read, from the uppermost row, the set of rows corresponding to the region of interest ROI among the plurality of rows. For example, the second pixel array 130_2 may, on the next frame, sequentially read from the $M^{th}$ row through the $N^{th}$ row corresponding to the region of interest ROI.

A readout operation of FIG. 6B and a readout operation of FIG. 6C may be sequentially repeated performed in different frames from each other. For example, in an odd-numbered frame, a third pixel array 130_3 may respond to the RS signal, and in an even-numbered frame, a fourth pixel array 130_4 may respond to the CR signal.

The operation mode of the image sensor 100 according to some example embodiments of the inventive concepts may be determined by the AP 20, and the determined operation mode may be received by the image sensor 100 as the mode signal MODE. The mode selecting circuitry 110 may, based on the mode signal MODE, output a readout signal to the row driver 120 and a binning signal to the binning circuitry 140. In addition, the AP 20 may set the region of interest ROI, generate the crop signal CROP indicating a row of the pixel array 130 corresponding to the region of interest ROI, and output the generated crop signal CROP to the image sensor 100.

When the RS signal is generated in the mode selecting circuitry 110 of the image sensor 100 according to some example embodiments of the inventive concepts, the enable signal ENABLE for operating the binning circuitry 140 may be generated together. Restated, the mode selecting circuitry 110 my generate the enable signal ENABLE concurrently with, and/or in response to, generating the RS signal (e.g., the first signal of the readout signal). It may be understood that the RS signal reads every odd-numbered row of all rows of the pixel array 130, and thus the column of the pixel array 130 may also need to be binned to maintain an aspect ratio of the image sensor 100. In other words, the RS signal and the enable signal ENABLE may be simultaneously generated and applied to the image sensor 100.

The operation mode of the image sensor 100 based on the RS signal, the CR signal, and the binning signal may be referred to as a first operation mode. Restated, the first operation mode may be an operation mode in which the mode selecting circuitry 110 is configured to generate the RS signal (e.g., first signal) and the CR signal (e.g., second signal). For example, the first operation mode may correspond to a mode in which the mode selecting circuitry 110 applies the ENABLE signal of the RS signal and the binning signal to the image sensor 100 for the current frame, and the mode selecting circuitry 110 applies the DISABLE signal of the CR signal and the binning signal for the next frame. Restated, the mode selecting circuitry 110, in the first operation mode, may be configured to, for a current frame, apply the RS signal (e.g., first signal) to the row driver 120 and an enable signal ENABLE to the binning circuitry 140, and, for a next frame, apply the CR signal (e.g., second signal) to the row driver 120 and a disable signal DISABLE to the binning circuitry 140.

The image sensor 100 operating in the first operation mode may generate two images having different angles of view from each other. For example, when a camera (e.g., camera module, which may be some or all of an individual image processing system 10) equipped with the image sensor 100 according to some example embodiments of the inventive concepts captures an image of an object at a speed of 120 fps (frame per second) in the first operation mode, the camera may generate about 60 images having a wide angle of view and about 60 images having a narrow angle of view. When the image sensor 100 operates in the first operation mode, a plurality of virtual channels may be used. For example, the eighth output image 4004 in FIG. 6A may be output through a first virtual channel, and the ninth output image 3004 in FIG. 6A may be output through a second virtual channel. In other words, the first virtual channel may be a passage of odd-numbered frames output by the image sensor 100 that is operating in the first operation mode, and the second virtual channel may be a passage of even-numbered frames output by the image sensor 100 that is operating in the first operation mode.

In other words, the image sensor 100 according to some example embodiments of the inventive concepts may, when operating in the first operation mode, generate images having different angles of view from each other by using only one camera module (e.g., one image processing system 10, one image sensor 100, or the like). In addition, since images having different angles of view from each other are generated by using only the image sensor 100, an immediate image processing may be possible and a post-processing of images at a fast speed may be possible, compared with a case where the ISP 200 generates images having different angles of view by using software. Thus, an image processing system 10 that includes at least the image sensor 100 may provide improved performance, versatility, and efficiency of use of computing resources and/or power consumption with regard to generating images having different angles of view, size, and/or resolution.

Figure 7A:
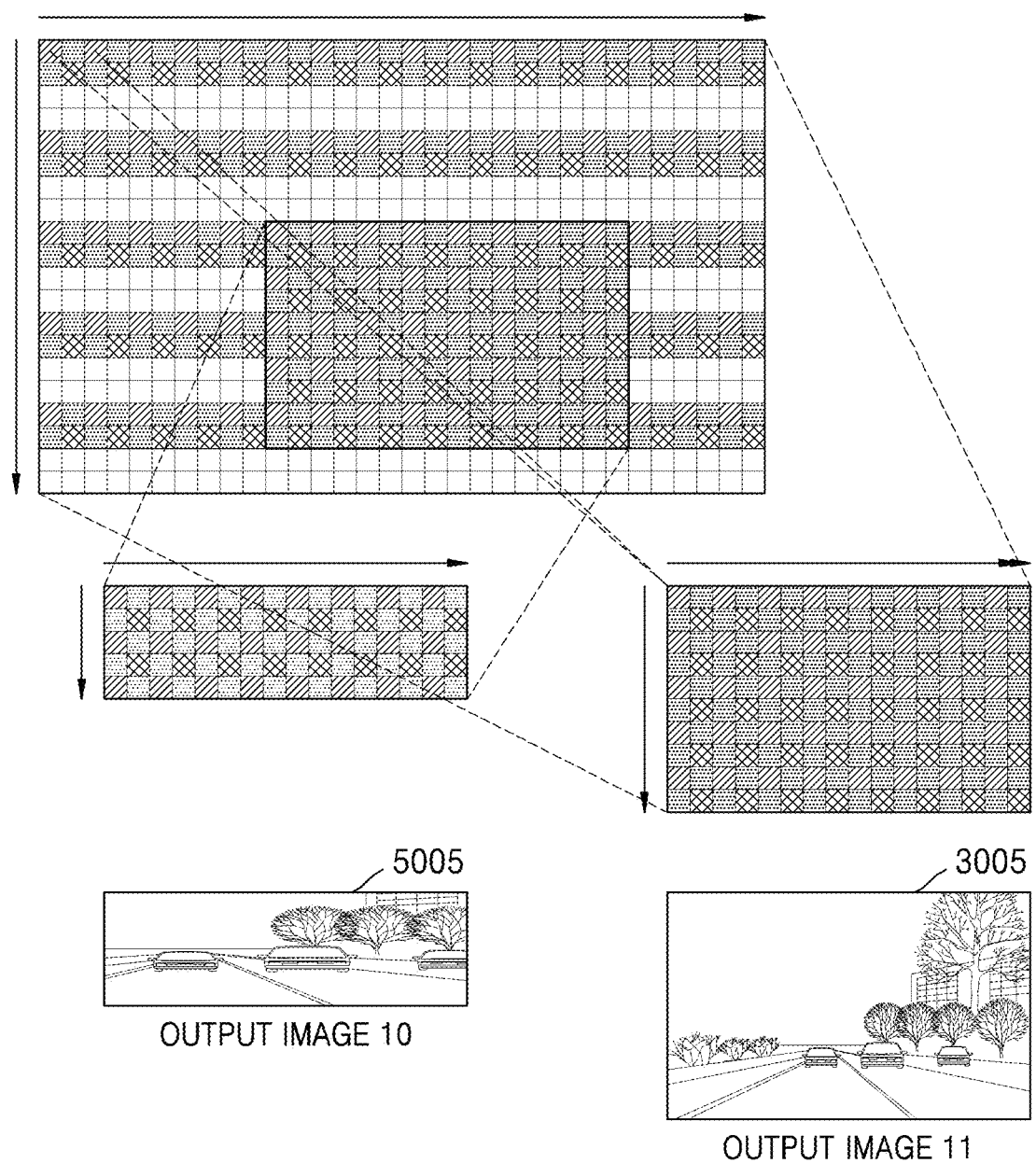
FIG. 7A is another diagram illustrating that images having different angles of view are output according to readout methods, according to some example embodiments of the inventive concepts.

FIG. 7A is another diagram illustrating that images having different angles of view are output according to readout methods, according to some example embodiments of the inventive concepts. A tenth output image 5005 in FIG. 7A may correspond to an image in which the image sensor 100 generates a frame image based on a readout method to which the crop-read (Crop_Read) method for reading every even-numbered row and the column-full-read (C-Full_Read) method are applied, and outputs the generated frame image via the display device 60, and an eleventh output image 3005 in FIG. 7A may correspond to an image in which the image sensor 100 generates a frame image based on a readout method to which the row-1read-1skip (R_1Read_1Skip) method and the 2-binning (2_Binning) method are applied and outputs the generated frame image via the display device 60. The tenth output image 5005 may be generated by reading even-numbered rows of the set of rows corresponding to the region of interest ROI, and may have the same horizontal length, a ½ times vertical length, and ½ resolution of the eighth output image 4004 in FIG. 6A.

Figure 7B:
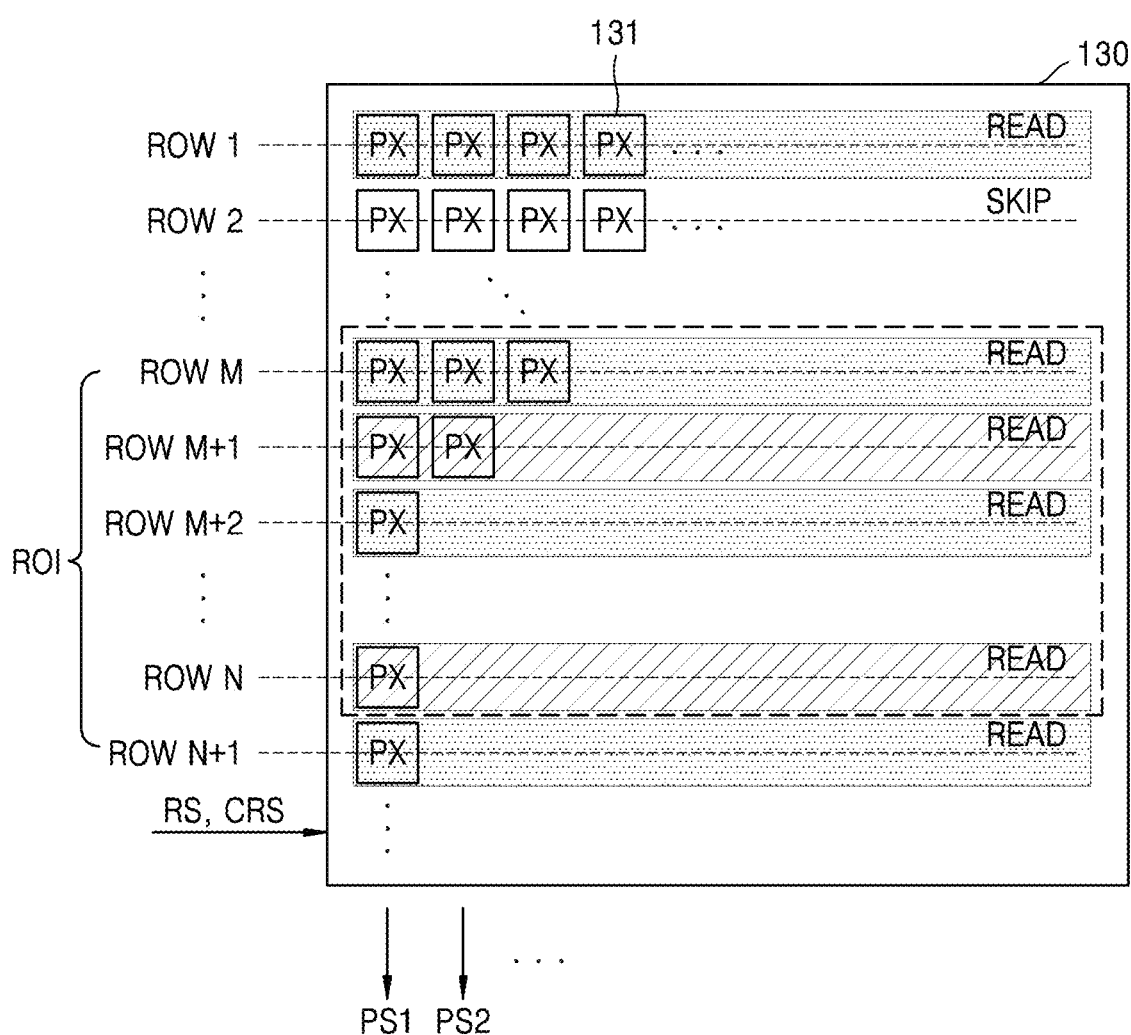
FIG. 7B is a diagram illustrating a readout method in which a pixel array of an image sensor reads out according to a readout signal in one frame, according to some example embodiments of the inventive concepts.

FIG. 7B is a diagram illustrating a readout method in which the pixel array 130 of the image sensor 100 reads out according to a readout signal in one frame, according to some example embodiments of the inventive concepts.

Referring to FIG. 7B together with FIG. 3, the mode selecting circuitry 110 may receive the mode signal MODE for the operation mode and the crop signal CROP for the region of interest ROI from the AP 20, output the RS signal and the CRS signal to the row driver 120, and output the binning signal to the binning circuitry 140. The row driver 120 may alternately repeat reading a plurality of rows of the pixel array 130 in the row-1read-1skip (R_1Read_1Skip) method in response to the RS signal, or may read only the even-numbered rows among the set of rows corresponding to the region of interest ROI in response to the CRS signal and skip the odd-numbered rows. Restated, the row driver 120 may read all odd-numbered rows among the plurality of rows of the pixel array 130, including odd-numbered rows corresponding to the region of interest ROI and odd-numbered rows that do not correspond to the region of interest ROI, and may read only a selection of even-numbered rows that correspond to the ROI and skip reading all even-numbered rows that do not correspond to the ROI. In other words, the even-numbered row read in response to the CRS signal among the plurality of rows corresponding to the region of interest ROI may be a row skipped in response to the RS signal, and the odd-numbered row skipped in response to the CRS signal among the plurality of rows corresponding to the region of interest ROI may be a row read in response to the RS signal.

When the currently driven row is not the row corresponding to the region of interest ROI, the row driver 120 may alternately repeat reading and skipping. For example, the row driver 120 may, in response to the RS signal, alternately repeat reading the first row or the uppermost row among all rows and skipping the second row immediately below the first row.

When the currently driving row is a row corresponding to the region of interest ROI ($M^{th}$ through $N^{th}$ rows), the set of rows corresponding to the region of interest ROI may be divided into odd-numbered rows ($M^{th}$ row, $(M+2)^{th}$, . . . ) and even rows ($(M+1)^{th}$ row, . . . , $N^{th}$ row).

The odd-numbered row among the set of rows corresponding to the region of interest ROI may be a row read in response to the RS signal. The mode selecting circuitry 110 may generate the enable signal ENABLE when generating the RS signal, and the binning circuitry 140 may sum the pixel signals that are read from the pixels on the odd-numbered row among the set of rows corresponding to the region of interest ROI.

The even-numbered row among the set of rows corresponding to the region of interest ROI may be a row read in response to the CRS signal. The mode selecting circuitry 110 may generate the disable signal DISABLE when generating the CRS signal, and the binning circuitry 140 may pass through the pixel signals that are read from the pixels on the even-numbered row among the set of rows corresponding to the region of interest ROI without summing the pixel signals.

In short, all odd-numbered rows of the plurality of rows of the pixel array 130 and all even-numbered rows of the set of rows corresponding to the region of interest ROI of the plurality of rows (but not even-numbered rows that are not within the set of rows corresponding to the region of interest ROI) may be read. For example, in FIG. 7B, all odd-numbered rows (first row, ..., $M^{th}$ row, $(M+2)^{th}$ row, ..., $(N+1)^{th}$ row, ...) and all even-numbered rows $(M+1)^{th}$ row, ..., $N^{th}$ row) among the set of rows corresponding to the region of interest ROI may be read.

The crop signal CROP for the region of interest ROI may also provide position information of the pixel 131 on the corresponding row, that is, position information of the column line. For convenience of description, it is outlined that a row corresponding to the region of interest ROI is read. However, it may be understood that when a readout using the crop-read (Crop_Read) method in units of rows is performed, the pixel signal within a column range corresponding to the region of interest ROI is received. In other words, when the mode selecting circuitry 110 generates the CR signal or the CRS signal, only the pixel signal within the column range corresponding to the region of interest ROI may be received by the column array 150.

Referring to FIG. 7B, an operation mode of the image sensor 100 that is operating based on the RS signal, the CRS signal, and the binning signal may be referred to as a second operation mode. Restated, the second operation mode may be an operation mode in which the mode selecting circuitry 110 is configured to generate the RS signal (e.g., first signal) and the CRS signal (e.g., third signal). For example, the second operation mode may be an operation mode of the image sensor 100 in which, when the RS signal is applied to the pixel array 130 for one frame, the enable signal ENABLE is applied to the binning circuitry 140, and when the CRS signal is applied to the pixel array 130, the disable signal DISABLE is applied to the binning circuitry 140. Restated, the mode selecting circuitry 110, in the second operation mode, may be configured to apply an enable signal ENABLE to the binning circuitry 140 in response to and/or concurrently with the mode selecting circuitry 110 applying the RS signal (e.g., first signal) to the row driver 120, and apply a disable signal DISABLE to the binning circuitry 140 in response to and/or concurrently with the mode selecting circuitry 110 applying the CRS signal (e.g., third signal) to the row driver 120. As shown in FIG. 7B, the row driver 120 may be configured to read all odd-numbered rows of the pixel array 130 based on the RS signal (e.g., first signal), and read an even-numbered row among rows corresponding to the ROI of the pixel array 130 based on the CRS signal (e.g., third signal) and the crop signal CROP.

The image sensor 100 operating in the second operation mode may generate two images having different angles of view from each other. For example, when a camera equipped with the image sensor 100 according to some example embodiments of the inventive concepts captures an image of an object at a speed of 120 fps (frame per second) in the first operation mode, the camera may generate about 120 images having a wide angle of view and about 120 images having a narrow angle of view. In comparison, unlike FIGS. 6B and 6C, in which two frames including the current frame and the next frame are to be read out, respectively, two images may be obtained by performing one readout in one frame in FIG. 7B, and an image relatively having two times larger than an original image may be generated.

In other words, the image sensor 100 according to some example embodiments of the inventive concepts may, when operating in the second operation mode, generate images having various angles of view from each other by using only one camera module (e.g., one image sensor 100, one image processing system 10, or the like). Thus, an image processing system 10 that includes at least the image sensor 100 may provide improved performance, versatility, and efficiency of use of computing resources and/or power consumption with regard to generating images having different angles of view, size, and/or resolution. As shown in FIG. 7A, the eleventh output image 3005 may be generated based on the read odd-numbered rows of the pixel array 130, while the tenth output image 5005 may be generated based on all read rows, both read odd-numbered rows and read even-numbered rows, that correspond to the region of interest ROI (e.g., not generated based on the read rows that do not correspond to the region of interest ROI).

Figure 8:
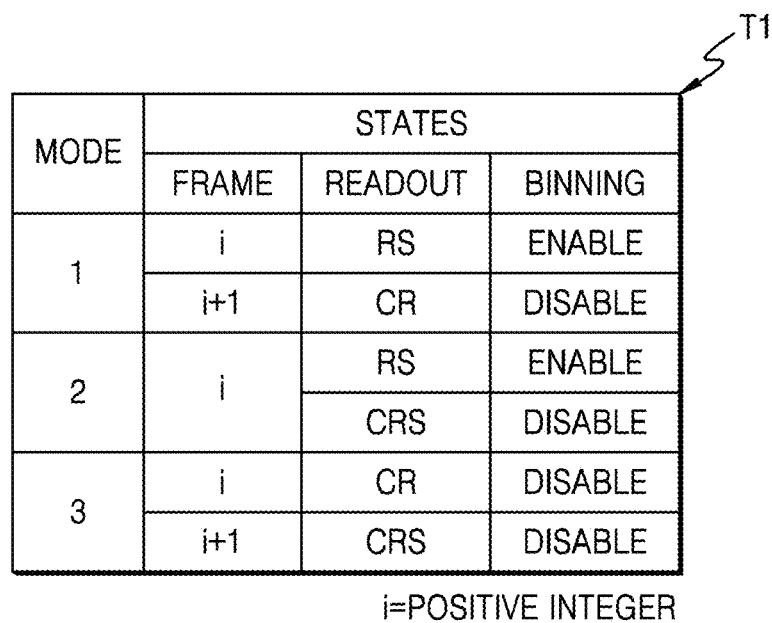
FIG. 8 is a table summarizing readout signals and a binning signal output for each operation mode, according to some example embodiments of the inventive concepts.

FIG. 8 is a table T1 summarizing readout signals (RS, CR, and CRS) and a binning signal output for each operation mode, according to some example embodiments of the inventive concepts.

Referring to FIG. 8 together with FIG. 3, when the operation mode and the region of interest ROI of the image sensor 100 are determined in the AP 20, the AP 20 may transmit the mode signal MODE and the crop signal CROP to the image sensor 100, the mode selecting circuitry 110 may, in response to the received mode signal MODE and crop signal CROP, output readout signals (RS, CR, CRS, etc.) corresponding to each operation mode to the row driver 120, and may output the binning signal corresponding to each operation mode and readout signal to the binning circuitry 140.

The first operation mode and a third operation mode may require an $i^{th}$ frame and an $(i+1)^{th}$ frame (i is a positive integer), that is, two frames, to generate an output image. The second operation mode may generate the output image with only one frame. The third operation mode is described later with reference to FIG. 10.

Figure 9:
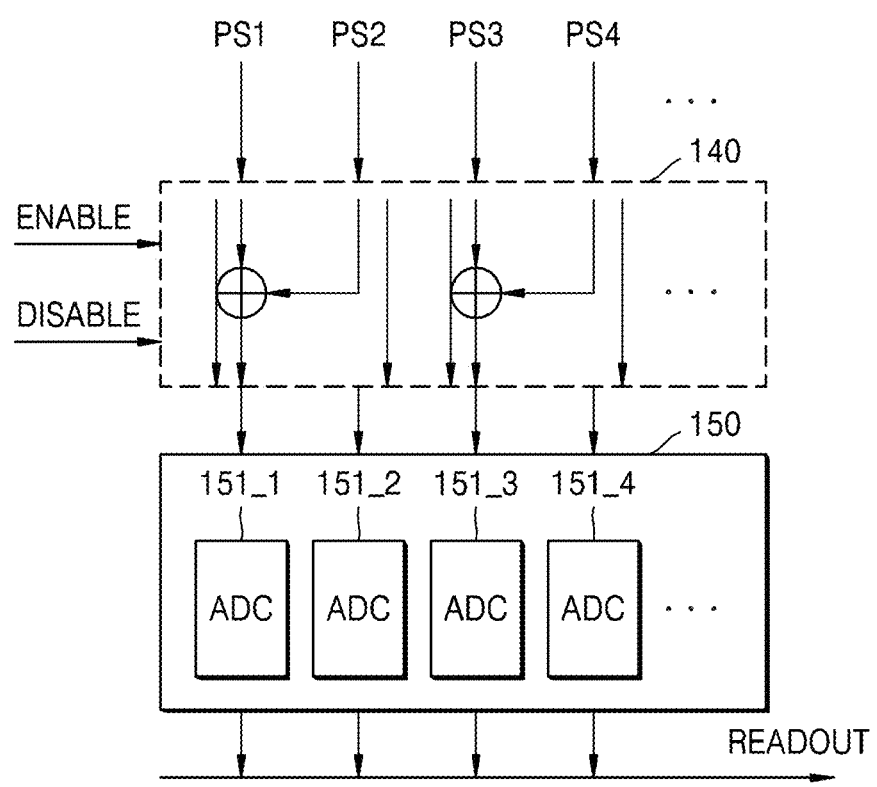
FIG. 9 is a circuit diagram illustrating a summing operation of a binning circuitry of an image sensor, according to a signal, according to some example embodiments of the inventive concepts.

FIG. 9 is a circuit diagram illustrating a summing operation of the binning circuitry 140 of the image sensor 100, according to a signal, according to some example embodiments of the inventive concepts.

First through fourth pixel signals PS1 through PS4 output from the pixel array 130 according to some example embodiments of the inventive concepts, based on the row driver 120 reading separate pixels 131 a row of the pixel array 130, may be applied to the binning circuitry 140. The binning circuitry 140 may operate or stop an operation thereof in response to the binning signal generated by the mode selecting circuitry 110. For example, the binning circuitry 140 may, based on the enable signal ENABLE, sum the first pixel signal PS1 and the second pixel signal PS2 and output a summed result thereof as a binned pixel signal to a first ADC 151_1 of the column array 150, and sum the third pixel signal PS3 and the fourth pixel signal PS4 and output a summed result thereof as a binned pixel signal to a third ADC 151_3 of the column array 150. In addition, for example, the binning circuitry 140 may, based on the disable signal DISABLE, pass through the first pixel signal PS1 and the second pixel signal PS2 and output the first pixel signal PS1 and the second pixel signal PS2 as binned pixel signals to the first ADC 151_1 and a second ADC 151_2 of the column array 150, respectively, and pass through the third pixel signal PS3 and the fourth pixel signal PS4 and output the third pixel signal PS3 and the fourth pixel signal PS4 as binned pixel signals to the third ADC 151_3 and a fourth ADC 151_4 of the column array 150, respectively. Restated, the binning circuitry 140 may be configured to read all pixels of a row of pixels 131 that is read by the row driver 120 based on the disable signal DISABLE, and sum and read every two pixels of the row of pixels 131 that is read by the row driver 120 based on the enable signal ENABLE.

Figure 10:
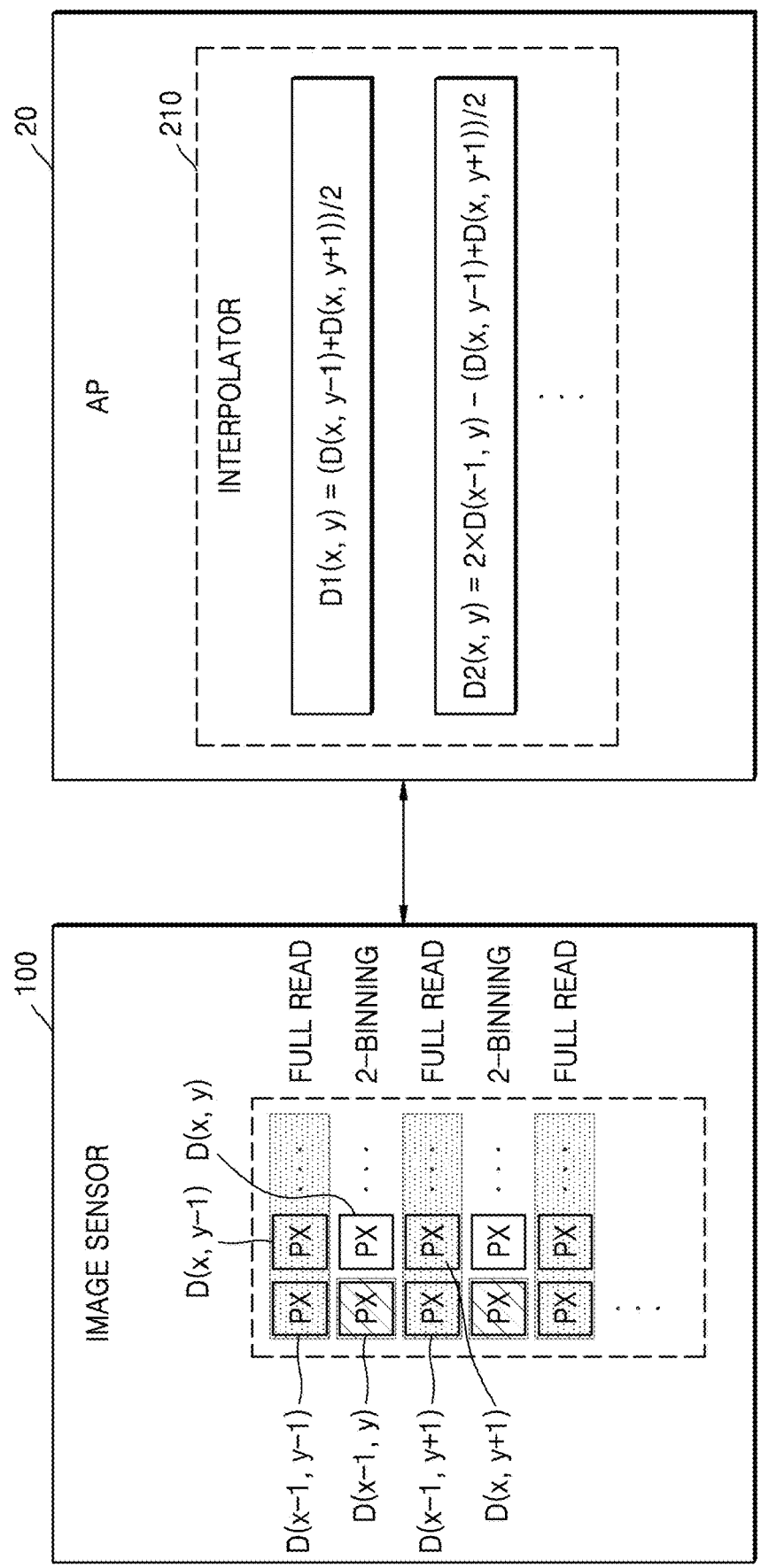
FIG. 10 is a diagram illustrating an interpolation operation of an image sensor, according to some example embodiments of the inventive concepts.

FIG. 10 is a diagram illustrating an interpolation operation of the image sensor 100, according to some example embodiments of the inventive concepts.

Referring again to FIG. 5A, the image sensor 100 operating in the second operation mode may read the even-numbered rows among the set of rows corresponding to the region of interest ROI, and generate the seventh output image 5003. The seventh output image 5003 may have the same horizontal length and a ½ vertical length of the sixth output image 4003. When the ratio between the horizontal length and vertical length is required to be kept constant, the AP 20 may restore an image having a height corresponding to the sixth output image 4003 through the interpolation operation.

Referring to FIG. 10, the AP 20 may include an interpolator 210 that restores pixel information of a row that is not read, by using a stochastic correlation between adjacent pixels of an image. The interpolator may be implemented by one or more instances of processing circuitry. The interpolator 210 may estimate pixel information (e.g., a pixel value) about a row that is not read (e.g., a skipped row), by using a logic circuit implementing arithmetic operations, including estimating an unread odd-numbered row among rows corresponding to the ROI of the pixel array 130 based on a pixel value of a read odd-numbered row and a summed pixel value of an even-numbered row. For example, when the image sensor 100 operates in the second operation mode, all odd-numbered rows of the pixel array 130 may be read and processed in units of columns by the column-full-read (C_Full_Read) method, and the even-numbered rows of the set of rows corresponding to region of interest ROI may be read and processed in units of columns by the 2-binning (2_Binning) method.

Referring to FIG. 10, the pixel values corresponding the pixels that are adjacent to a target pixel value D(x,y) to be restored and are to be read by the column-full-read (C_Full_Read) method as the odd-numbered rows may be represented as D(x−1,y−1), D(x,y−1), and D(x−1,y+1), and the pixel that is adjacent to a target pixel value D(x,y) to be restored and is to be read by the 2-binning (2_Binning) method as the even-numbered row may be represented as D(x−1,y) For example, the interpolator 210 may obtain an arithmetic average of the pixel values D(x,y−1) and D(x,y+1) that are directly adjacent to the target pixel value D(x,y) on the odd-numbered rows and have been read by the column-full-read (C_Full_Read) method, and generate a first restoring value D1.

$$D1(x, y) = \frac{D(x, y-1) + D(x, y+1)}{2} \quad [\text{Formula 1}]$$

The first restoring value D1 generated by using Formula 1, also referred to herein as a conversion value of a read pixel, may be a result of an assumption of linear data deviation between upper and lower pixels. Formula 1 may be referred to as a linear interpolation.

Referring to FIG. 10, the interpolator 210 may generate a second restoring value D2 based on the pixel values D(x, y−1) and D(x,y+1) that are directly adjacent to the target pixel value D(x,y) and have been read by the column-full-read (C_Full_Read) method on the odd-numbered rows, and the pixel value D(x−1,y) of the even-numbered row that has been read by the 2-binning (2_Binning) method.

$$D2(x, y) = 2 \times D(x-1, y) - \frac{D(x, y-1) + D(x, y+1)}{2} \quad [\text{Formula 2}]$$

The second restored value D2 generated by using Formula 2, also referred to herein as a converted value that has been summed by the binning circuitry 140, may estimate more precisely information about the target pixel value D(x,y) that has been lost due to the summing in the binning circuitry 140 than the first restored value D1(*x,y*), by additionally using information about the even-numbered row that has been read through performing the 2-binning (2_Binning) method, in addition to the assumption of the linear data deviation between the upper pixel and the lower pixel.

Although two restoration methods are presented in FIG. 10, the methods are not limited thereto, and other various interpolation methods may be used. For example, various interpolation methods such as a weighted sum interpolation method, a spline interpolation method, an exponential interpolation method, a log-linear interpolation method, a bilinear interpolation method, and a cubic interpolation method may be performed. In addition, an interpolator may include various logic circuits that perform mathematical operations such as a differentiator and an integrator, in addition to a logic circuit that performs arithmetic operations in response to various interpolation methods.

The image processing system 10 according to some example embodiments of the inventive concepts may be implemented such that the image sensor 100 and the AP 20 form a closed loop. For example, the image sensor 100 may receive the crop signal CROP for the region of interest ROI generated in the AP 20 and the mode signal MODE determining the operation of the image sensor 100. The AP 20 may output a signal (not illustrated) that finely controls the operation of the image sensor 100, for example, by restoring the image by receiving again the first through fifth output images (1001, 2001, 1002, 3002, and 1003) or the row data Row_DTA output from the image sensor 100, or by reducing a white noise of the image by controlling a gain of the image sensor 100 through a sensor exposure control. Accordingly, the new crop signal CROP and the new mode signal MODE may be updated. Thus, based on the image sensor 100 including mode selecting circuitry 110 configured to control the row driver 120 and the binning circuitry 140 to change an operation mode of the image sensor 100 (e.g., between the first, second, and/or third operation modes as described herein) based on at least a mode signal MODE received at the image sensor 100 (e.g., from the AP 20) to change the operation mode of the image sensor 100, an image processing system 10 that includes the image sensor 100 and the AP may provide improved performance, versatility, and efficiency of use of computing resources and/or power consumption with regard to generating images having different angles of view, size, and/or resolution.

Although not illustrated in the drawings, an operation mode of the image sensor 100 operating based on the CR signal, the CRS signal, and the disable signal DISABLE may be referred to as the third operation mode. For example, in the third operation mode, for two frames including the current frame and the next frame, the CR signal may be applied to the current frame while the CRS signal is applied to the next frame, and the binning signal may be disabled for both frames. Restated, the third operation mode may be an operation mode in which the mode selecting circuitry 110 is configured to generate the CR signal (e.g., second signal) and the CRS signal (e.g., third signal). The mode selecting circuitry 110, in the third operation mode, may be configured to apply the disable signal DISABLE to the binning circuitry 140 in response to and/or concurrently with the mode selecting circuitry applying the CR signal (e.g., second signal) to the row driver 120, and apply the CRS signal (e.g., third signal) to the row driver 120 and the disable signal DISABLE to the binning circuitry based on the CR signal (e.g., second signal) and the crop signal CROP. As a result, the target pixel D(x,y) which has not been read in the current frame may be read in the next frame. Accordingly, since the third operation mode is capable of comparing the restoring value with the actually read pixel value, the third operation mode may be used as a test mode for verifying the interpolator 210.

FIG. 11 is a block diagram of an image processing system 10, according to some example embodiments of the inventive concepts.

Referring to FIG. 2 and FIG. 11, the image processing system 10 may include the image sensor 100, the AP 20, the display device 60, a lens 70, and an object 80. The image sensor 100 may include the mode selecting circuitry 110, the row driver 120, the pixel array 130, the binning circuitry 140, and the column array 150, the AP 20 may include the ISP 200, a camera controller 220, and a personal computer (PC) interface (I/F) 230, the ISP 200 may include the interpolator 210, and the image sensor may further include other functional blocks.

In some example embodiments, at least some of the AP 20, including one or more, or all, of the PC I/F 230, the camera controller 220, or the image signal processor 200 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of at least some of the AP 20, including one or more, or all, of the PC I/F 230, the camera controller 220, or the image signal processor 200. In some example embodiments, the PC I/F 230, the camera controller 220, or the image signal processor 200 may be implemented by separate processing circuities. In some example embodiments, two or more, or all, of PC I/F 230, the camera controller 220, or the image signal processor 200 may be implemented by a same processing circuitry.

In some example embodiments, at least some of the image sensor 100 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of at least some of the image sensor 100.

The operation of the image sensor 100 of the image processing system 10 of FIG. 11 may be similar to the operation of the image sensor 100 in FIG. 3. Thus, descriptions already given are omitted, and only differences between the operation of the image processing system 10 of FIG. 11 and the operation of the image sensor 100 in FIG. 3 are described.

The image sensor 100 may sense the object 80 photographed by using the lens 70 under the control of the AP 20, and the AP 20 may display the image that has been sensed and output by the image sensor 100 to the display device 60. In this case, the display device 60 may include all devices capable of outputting an image. For example, the display device 60 may include a computer, a mobile phone, and other image output terminals.

A timing generating circuitry 160 may provide control signals, address signals, and/or clock signals respectively corresponding to components of the image sensor 100, for example, the mode selecting circuitry 110, the pixel array 130, the row driver 120, the column array 150, and a ramp signal generating circuitry 170. The mode selecting circuitry 110, the pixel array 130, the row driver 120, the column array 150, and the ramp signal generating circuitry 170 may operate per timings set for respective components based on control signals, address signals, and/or clock signals provided from the timing generating circuitry 160.

The ramp signal generating circuitry 170 may generate a ramp signal having a slope that is set based on the ramp control signal provided by the timing generating circuitry 160. The generated ramp signal RMP may be compared with the pixel signal in the column array 150.

An output buffer 152 may temporarily store a plurality of digital values output from a plurality of counters (not illustrated), and amplify and sequentially output the stored digital values. The output buffer 152 may include a plurality of memories and a plurality of sense amplifiers.

The AP 20 may include the ISP 200, the camera controller 220, and the PC I/F 230. For example, the camera controller 220 may control the image sensor 100 by using an inter-integrated circuit I2C. However, the example embodiments are not limited thereto, and various interfaces may be applied between the camera controller 220 and the image sensor 100. In addition to the ISP 200, the camera controller 220, and the PC I/F 230, the AP 20 may include various intellectual property (IP) blocks such as a color interpolation block, a lens shading correction block, an automatic white balance block, a chromatic aberration correction block, a noise removal block, and a gamma correction block.

The AP 20 may detect a removal region in an image including one frame or a plurality of frames, which is a set of read rows, and may output the crop signal CROP and the mode signal MODE that are related to the removal region to the image sensor 100. For example, the mode selecting circuitry 110 may, in response to the crop signal CROP, operate to cause the row driver to skip a row corresponding to the removal region among the rows of the pixel array 130. For example, the AP 20 may not set a portion corresponding to the sky as the region of interest ROI such that the region detected as the sky is not set as the region of interest ROI. For example, the AP 20 may exclude from the region of interest ROI from the uppermost row of the image sensor 100 vertically downward to a row that is proportional to ¼ of a height of the image sensor 100, and may output the excluded crop signal CROP to the image sensor 100. The number ¼ may be merely an example, and various ratios such as ⅓, ½, and ¾ may be used to exclude rows from the region of interest ROI.

Figure 12:
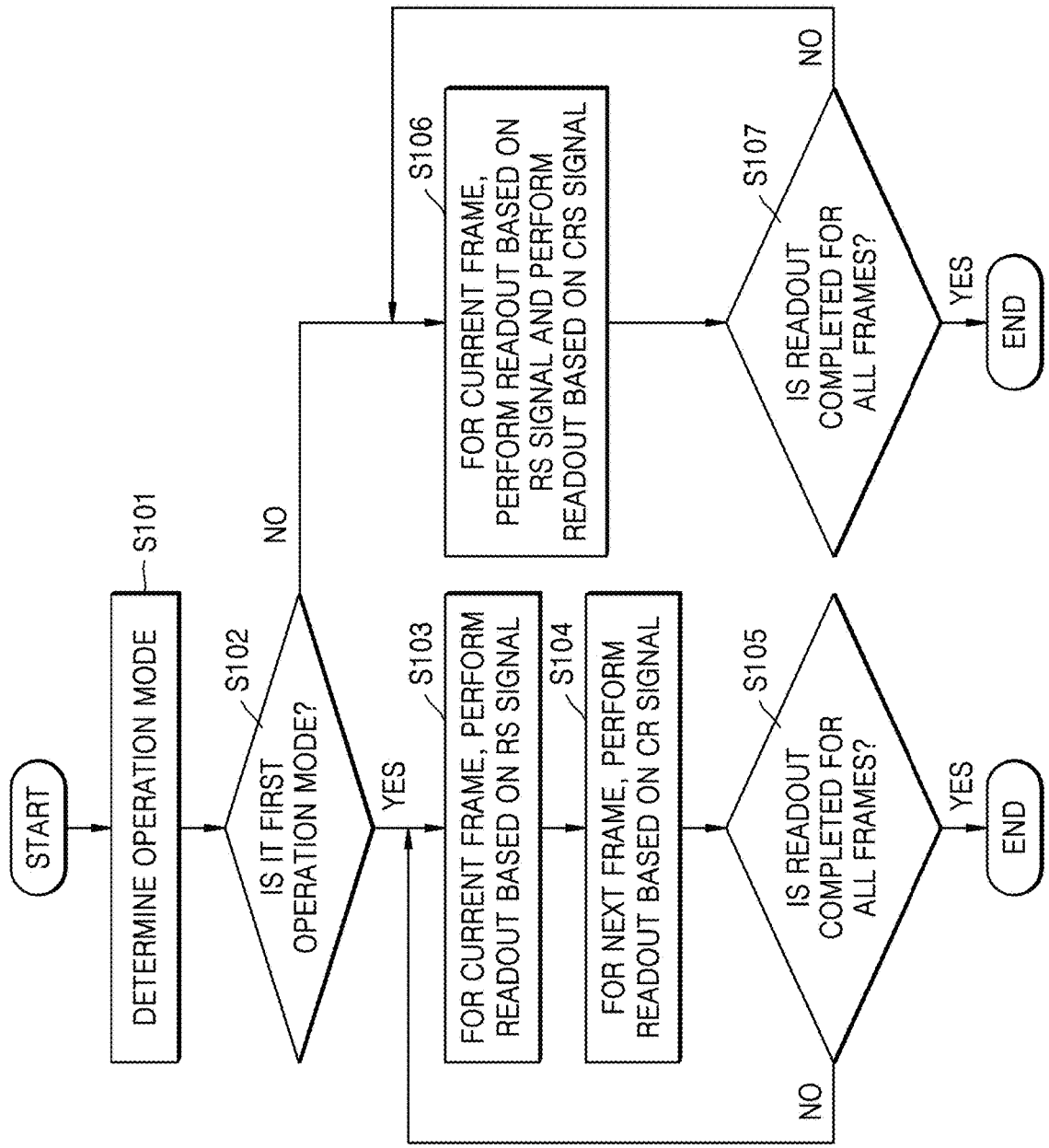
FIG. 12 is a flowchart of an operation method of an image sensor, according to some example embodiments of the inventive concepts.

FIG. 12 is a flowchart of an operation method of the image sensor 100, according to some example embodiments of the inventive concepts. Since FIG. 12 illustrates an operation method of the image sensor 100, while the third operation mode that is used as the test mode of the interpolator 210 in the image processing system 10 is excluded, the image sensor 100 is described to operate based on the first operation mode and the second operation mode.

The image sensor 100 may receive the mode signal MODE that is output outside and determines the operation mode of the image sensor 100 (S101). The image sensor 100 may identify one operation mode among the first through third operation modes based on the mode signal MODE (S102).

Next, when the operation mode is the first operation mode, the mode selecting circuitry 110 may generate and output an RS signal to the row driver 120, and the row driver 120 may, in response to the RS signal for the current frame, perform the row-1read-1skip (R_1Read_1Skip) readout on the plurality of rows of the pixel array 130 (S103). Next, the mode selecting circuitry 110 may generate and output the CR signal for the next frame to the row driver 120, and the row driver 120 may perform the crop-read (Crop_Read) readout reading the row corresponding to the region of interest ROI among the plurality of rows of the pixel array 130 in response to the received CR signal (S104). Next, when a required number of images having different angles of view have not been generated by performing readout on all of the plurality of frames at least partially comprising the images, the row-1read-1skip (R_1Read_1Skip) readout associated with the RS signal for the current frame may be performed again, and when the row-1read-1skip (R_1Read_1Skip) readout has been performed and the required number of images having different angles of view have been generated, the process may be ended (S105).

When the operation mode is not the first operation mode, that is, the second operation mode, the row driver 120 may perform the row-1read-1skip (R_1Read_1Skip) readout for the plurality of rows of the pixel array 130 in response to the RS signal for the current one frame, and may perform the crop-read (Crop_Read) readout that reads the even-numbered row among the set of rows corresponding to the region of interest ROI among the plurality of rows of the pixel array 130 in response to the CRS signal (S106). Next, when the required number of images having different angles of view have not been generated by performing readout on all of the plurality of frames at least partially comprising the images, the row-1read-1skip (R_1Read_1Skip) readout and the crop-read (Crop_Read) readout may be performed again for the current frame, and when both the readouts have been performed and the required number of images having different angles of view have been generated, the process may be ended (S105).

Figure 13:
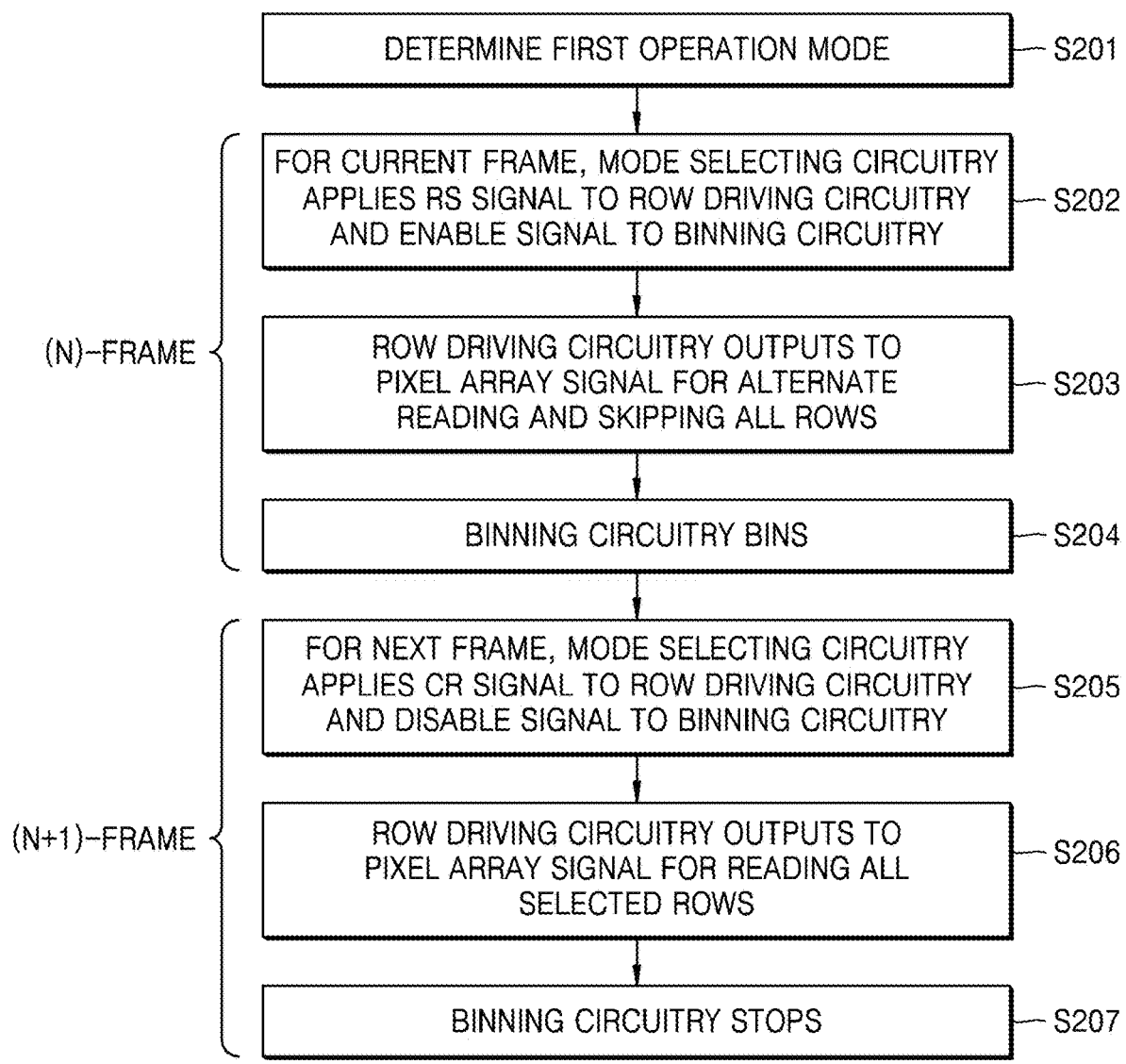
FIG. 13 is a flowchart of an operation method of an image sensor in a first operation mode, according to some example embodiments of the inventive concepts.

FIG. 13 is a flowchart of an operation method of the image sensor 100 in the first operation mode, according to some example embodiments of the inventive concepts.

The image sensor 100 may identify the first operation mode based on the mode signal MODE (S201).

Next (e.g., in response to S201), for the current frame, the mode selecting circuitry 110 may generate and output the RS signal to the row driver 120, and generate and output the enable signal ENABLE to the binning circuitry 140 (S202). Then, for the current frame, the row driver 120 may alternately read and skip all rows of the pixel array 130 in response to the received RS signal. For example, the row driver 120 may read the odd-numbered rows and skip the even-numbered rows among all rows of the pixel array 130 (S203). Next, in the current frame, the binning circuitry 140 may add signals at the binning circuitry 140 in response to the received enable signal ENABLE (S204).

Next, for the next frame, the mode selecting circuitry 110 may generate and output the CR signal to the row driver 120, and generate and output the disable signal DISABLE to the binning circuitry 140 (S205). Next, for the next frame, the row driver 120 may read the row corresponding to the region of interest ROI of the plurality of rows of the pixel array 130 in response to the received CR signal. For example, the row driver 120 may read all the set of rows corresponding to the region of interest ROI of the plurality of rows of the pixel array 130 (S206). Next, in the next frame, the binning circuitry 140 may pass through signals that are received by the binning circuitry 140 in response to the received disable signal DISABLE (S207). The above process may be repeated until the required number (e.g., quantity) of images having different angles of view are generated by performing the readouts for all of the plurality of frames.

Figure 14:
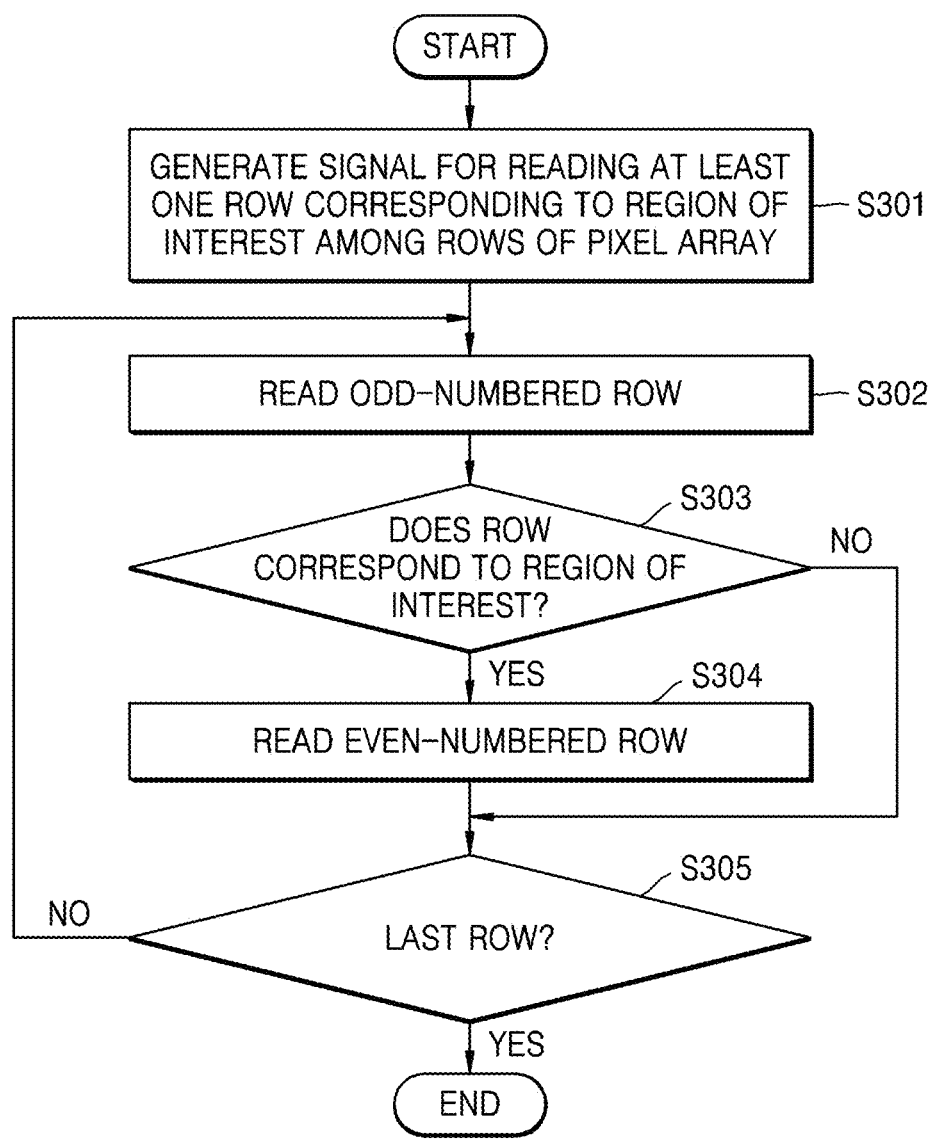
FIGS. 14 and 15 are flowcharts of operation methods of an image sensor in the second operation mode, according to some example embodiments of the inventive concepts.
Figure 15:
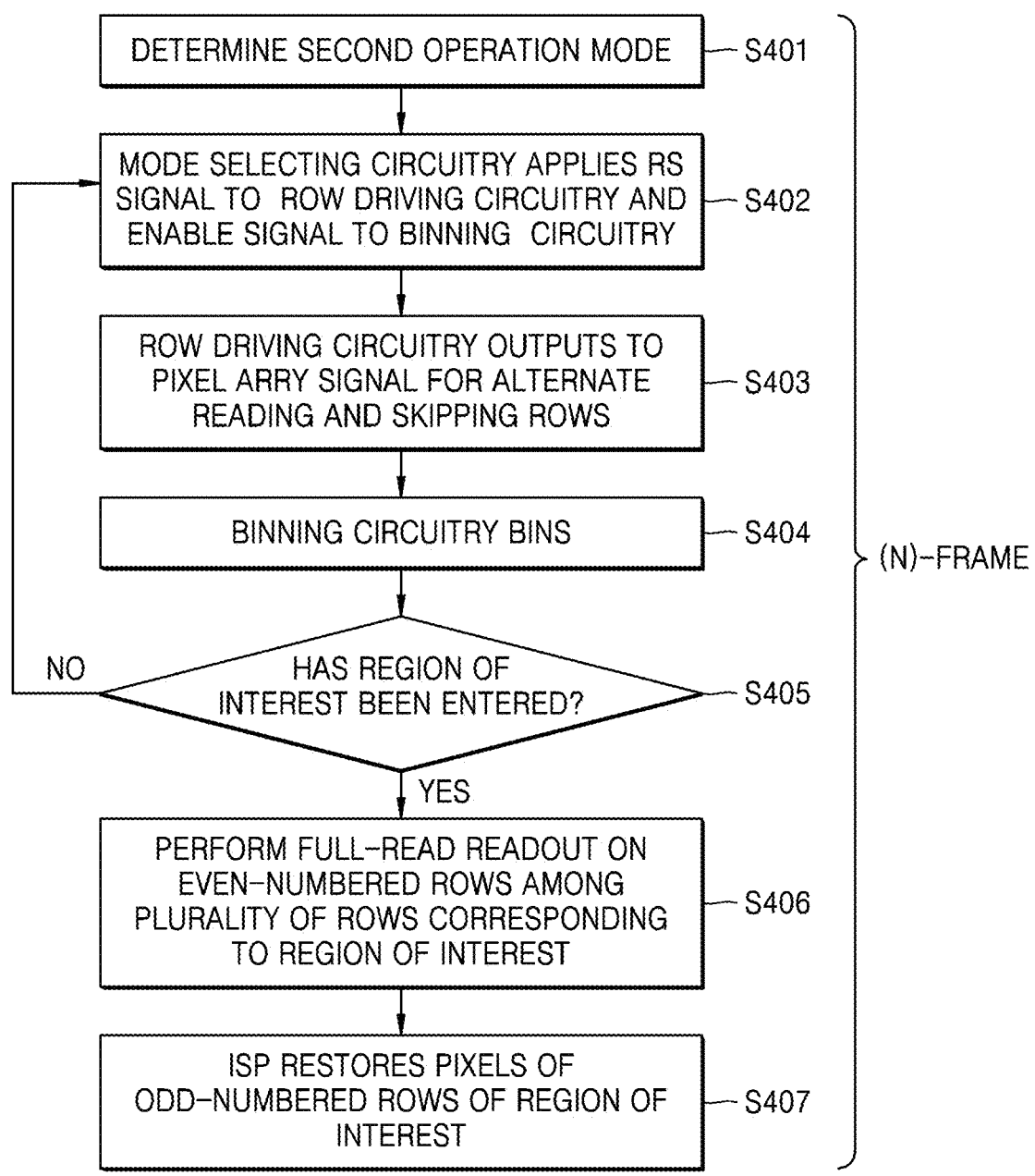

FIGS. 14 and 15 are flowcharts of operation methods of the image sensor 100 in the second operation mode, according to some example embodiments of the inventive concepts.

Referring to FIG. 14, the operation method of the image sensor 100 may include: generating, by the mode selecting circuitry 110, signals (for example, RS, CR, and CRS) reading at least one row corresponding to the plurality of rows of the pixel array 130 based on external signals (for example, MODE, CROP, etc.) for the region of interest ROI (S301); next, reading the odd-numbered rows among the plurality of rows of the pixel array 130 (S302); and next, determining whether a row to be read now is the row corresponding to the region of interest ROI based on the external signals (S303).

When the row to be read now is the row corresponding to the region of interest ROI, the even-numbered row of the set of rows corresponding to the region of interest ROI among the plurality of rows may be also read out (S304), and next, whether the row to be read now is the last row of the pixel array 130 may be determined (S305). The operation of reading the even-numbered row of the set of rows corresponding to the region of interest ROI may also include an operation of summing every two pixels of the even-numbered row and outputting a summed result as the pixel signal.

When the row to be read now is not the row corresponding to the region of interest ROI, whether the row to be read now is the last row of the pixel array 130 may be determined (S305).

When the row to be read now is determined as not the last row of the pixel array 130, the odd-numbered rows may be continuously read out, and when the row to be read now is determined as the last row of the pixel array 130, the operation of the image sensor 100 may be terminated.

Referring to FIG. 15, the image sensor 100 may identify whether the operation mode is a second operation mode, by receiving a mode signal MODE that is input from the outside and determines an operation mode of the image sensor 100 (S401). Next, in one frame, the mode selecting circuitry 110 may apply the RS signal to the row driver 120, and may apply the enable signal ENABLE to the binning circuitry 140 (S402). Next, the row driver 120 may alternately repeat reading and skipping every row of the pixel array 130. For example, the row driver 120 may read the odd-numbered rows and skip the even-numbered rows among all rows of the pixel array 130 (S403). Next, the binning circuitry 140 may add the pixel signals of the read rows in response to the enable signal ENABLE (S404).

Next, the image sensor 100 may determine whether the region of interest ROI has been entered (S405). When the region of interest ROI has not been entered, the row driver 120 may repeat an operation of reading all odd-numbered rows of the pixel array 130. When the region of interest ROI has been entered, the row driver 120 may maintain the operation of reading all odd-numbered rows of the pixel array 130, and may additionally perform the column-full read (C_Full_Read) readout on the even-numbered row among the set of rows corresponding to the region of interest ROI of the plurality of rows of the pixel array 130 (S406). Next, the image sensor 100 may output the raw data Row_DTA to the AP 20, and the ISP 200 of the AP 20 may restore the pixel on the unread odd-numbered row among the set of rows corresponding to the region of interest ROI (S407).

Figure 16:
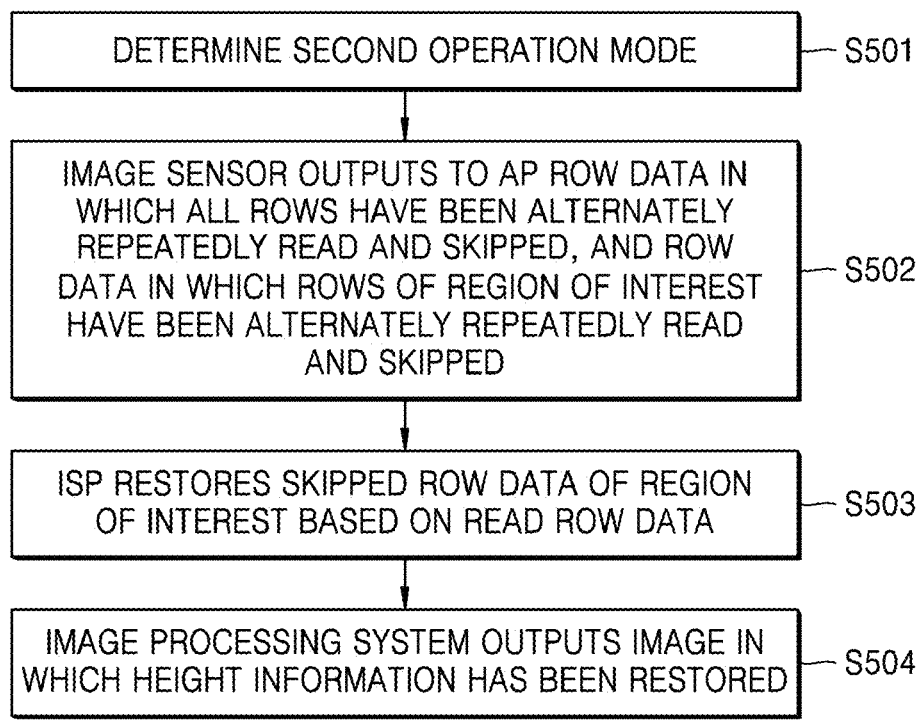
FIG. 16 is a flowchart of an operation method of an image processing system in a second operation mode, according to some example embodiments of the inventive concepts.

FIG. 16 is a flowchart of an operation method of the image processing system 10 in the second operation mode, according to some example embodiments of the inventive concepts.

Referring to FIG. 16, the image sensor 100 may identify the second operation mode (S501). Next, the image sensor 100 may output the first row data Row_DTA_1 that has been obtained by an alternate repetition of reading and skipping for all rows, and a second row data Row_DTA_2 that has been obtained by an alternate repetition of reading and skipping the set of rows corresponding to the region of interest ROI to the AP 20 (S502). Next, the interpolator 210 of the ISP 200 may restore the target pixel of the skipped row in the region of interest ROI based on the pixels on the row that has already been read (S503). Next, the ISP 200 may output (e.g., transmit, display, etc.) an image in which a vertical resolution has been restored to the display device 60 or the electronic device 1 (S504). Such output may include providing an image to be displayed by the display device 60. In some example embodiments, where the electronic device 1 is a vehicle, the output may include providing the image to processing circuitry of the vehicle that may process the image to facilitate operation of a navigation and/or driving control system of the vehicle. Accordingly, based on including an image processing system 10 that includes an image sensor 100 according to any example embodiments that is configured to change operation mode and/or generate various images having various size, resolution, angle of view, or the like, an electronic device 1 that is a vehicle may be configured to provide improved navigation and/or driving control thereof based on processing said images.

As described above, example embodiments have been disclosed in the drawings and the specification. While some example embodiments have been described herein with reference to specific terms, it should be understood that they have been used only for the purpose of describing the technical idea of the inventive concepts and not for limiting the scope of the inventive concepts as defined in the claims. Thus, those with ordinary skill in the art will appreciate that various modifications and equivalent example embodiments are possible without departing from the scope of the inventive concepts. Therefore, the true scope of protection of the inventive concepts should be determined by the technical idea of the appended claims.

While the inventive concepts have been particularly shown and described with reference to example embodiments thereof, it will be understood that various changes in form and details may be made therein without departing from the spirit and scope of the following claims.

What is claimed is:

1. An image sensor, comprising:
a pixel array including a plurality of pixels arranged in a matrix, the plurality of pixels configured to generate separate, respective pixel signals;
a row driver configured to select pixels of a plurality of rows of the pixel array;
a binning circuitry configured to selectively sum or pass through pixel signals of the selected pixels to generate binned pixel signals;
a column array including a plurality of analog-to-digital converters (ADCs) configured to perform an analog-to-digital conversion on the binned pixel signals; and
a mode selecting circuitry configured to control the row driver and the binning circuitry to change an operation mode of the image sensor based on a mode signal received at the image sensor to change the operation mode of the image sensor,
wherein the mode selecting circuitry is configured to generate a readout signal to cause the row driver to selectively read a set of rows, of the plurality of rows of the pixel array, corresponding to a region of interest (ROI), based on a crop signal received at the image sensor, the crop signal including row information corresponding to the ROI,
wherein the mode selecting circuitry is configured to change the operation mode of the image sensor to a first operation mode in which the mode selecting circuitry generates
a first signal that commands an alternate sequential repetition of reading a first row of the plurality of rows and skipping a second row of the plurality of rows that is immediately below the first row, and
a second signal that commands sequential reading of the set of rows corresponding to the ROI,
wherein the mode selecting circuitry is further configured to change the operation mode of the image sensor to a second operation mode in which the mode selecting circuitry generates the first signal and a third signal that commands alternate repetition of reading and skipping, sequentially, the set of rows corresponding to the ROI, and
wherein the mode selecting circuitry is further configured to change the operation mode of the image sensor to a third operation mode in which the mode selecting circuitry generates the second signal and the third signal.

2. The image sensor of claim 1, wherein
the mode selecting circuitry is configured to generate an enable signal in response to generating the first signal.
3. The image sensor of claim 1, wherein
the mode selecting circuitry, in the first operation mode, is configured to,
  for a current frame, apply the first signal to the row driver and an enable signal to the binning circuitry, and
  for a next frame, apply the second signal to the row driver and a disable signal to the binning circuitry.
4. The image sensor of claim 1, wherein
the mode selecting circuitry, in the second operation mode, is configured to,
  apply an enable signal to the binning circuitry in response to the mode selecting circuitry applying the first signal to the row driver, and
  apply a disable signal to the binning circuitry in response to the mode selecting circuitry applying the third signal to the row driver.
5. The image sensor of claim 4, wherein
the row driver is configured to
  select all odd-numbered rows of the pixel array based on the first signal, and
  select an even-numbered row among the set of rows corresponding to the ROI of the pixel array based on the third signal and the crop signal, and
the binning circuitry is configured to read all pixels of selected row based on the disable signal, and sum and read every two pixels of the selected row based on the enable signal.
6. The image sensor of claim 1, wherein
the mode selecting circuitry, in the third operation mode, is configured to,
  apply a disable signal to the binning circuitry in response to the mode selecting circuitry applying the second signal to the row driver, and
  apply the third signal to the row driver and the disable signal to the binning circuitry based on the second signal and the crop signal.
7. An image processing system, comprising:
an image sensor configured to change readout of a row of pixels of a pixel array according to an operation mode of the image sensor; and
processing circuitry configured to process frames output from the image sensor,
wherein the image sensor includes
  the pixel array, wherein the pixel array includes a plurality of pixels arranged in a matrix, the plurality of pixels configured to generate separate, respective pixel signals in units of rows of a plurality of rows of pixels of the pixel array,
  a row driver configured to select pixels of a selected row of the plurality of rows,
  a binning circuitry configured to selectively sum or pass through pixel signals of the selected pixels to generate binned pixel signals,
  a column array configured to perform an analog-to-digital conversion on the binned pixel signals, and
  a mode selecting circuitry configured to control the row driver and the binning circuitry based on a mode signal received at the image sensor to change the operation mode of the image sensor,
wherein the processing circuitry is configured to
  output a crop signal setting a region of interest (ROI),
  output the mode signal to set the operation mode of the image sensor, and
  process a row image of an image read from the image sensor
wherein the processing circuitry is configured to set the operation mode to be a first operation mode in which the mode selecting circuitry generates a first signal and a second signal, the first signal commanding an alternate sequential repetition of reading a first row of the plurality of rows and skipping a second row of the plurality of rows that is immediately below the first row, the second signal commanding sequentially reading of a set of rows corresponding to the ROI,
wherein the processing circuitry is further configured to set the operation mode to be a second operation mode in which the mode selecting circuitry generates the first signal and a third signal, the third signal commanding an alternate repetition of sequential reading and skipping of the set of rows corresponding to the ROI,
wherein the processing circuitry is further configured to set the operation mode to be a third operation mode in which the mode selecting circuitry generates the second signal and the third signal.
8. The image processing system of claim 7, wherein
the processing circuitry is configured to estimate a pixel value of a skipped row.
9. The image processing system of claim 8, wherein
the processing circuitry is configured to estimate the pixel value of the skipped row based on a conversion value of selected pixel and a converted value that has been summed by the binning circuitry.
10. The image processing system of claim 7, wherein
the mode selecting circuitry, in the first operation mode, is configured to,
  for a current frame, apply the first signal to the row driver and an enable signal to the binning circuitry, and
  for a next frame, apply the second signal to the row driver and a disable signal to the binning circuitry.
11. The image processing system of claim 7, wherein
the mode selecting circuitry, in the second operation mode, is configured to,
  apply an enable signal to the binning circuitry in response to the mode selecting circuitry applying the first signal to the row driver, and
  apply a disable signal to the binning circuitry in response to the mode selecting circuitry applying the third signal to the row driver,
wherein the row driver is configured to
  select all odd-numbered rows of the pixel array based on the first signal, and
  select an even-numbered row among the set of rows corresponding to the ROI of the pixel array based on the third signal and the crop signal.
12. The image processing system of claim 11, wherein
the binning circuitry is configured to read all pixels of the selected row based on the disable signal, and sum and read every two pixels of the selected row based on the enable signal, and
the processing circuitry is configured to estimate an unselected odd-numbered row among rows corresponding to the ROI of the pixel array based on a pixel value of a selected odd-numbered row and a summed pixel value of the even-numbered row.
13. The image processing system of claim 7, wherein
the processing circuitry is configured to detect a removal region in a frame that is a set of read rows, and the mode selecting circuitry is configured to control the row driver to skip a row corresponding to the removal region among the plurality of rows of pixels of the pixel array in response to the crop signal.

* * * * *